United States Patent
Blankenship et al.

(10) Patent No.: US 9,198,181 B2
(45) Date of Patent: Nov. 24, 2015

(54) ENHANCED COMMON DOWNLINK CONTROL CHANNELS

(75) Inventors: Yufei Wu Blankenship, Kildeer, IL (US); Shiwei Gao, Nepean, CA (US); Hua Xu, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 300 days.

(21) Appl. No.: 13/545,548

(22) Filed: Jul. 10, 2012

(65) Prior Publication Data

US 2013/0242882 A1    Sep. 19, 2013

Related U.S. Application Data

(60) Provisional application No. 61/612,804, filed on Mar. 19, 2012.

(51) Int. Cl.
*H04W 72/00*  (2009.01)
*H04W 72/04*  (2009.01)
*H04L 5/00*  (2006.01)

(52) U.S. Cl.
CPC ......... *H04W 72/0453* (2013.01); *H04L 5/0037* (2013.01); *H04L 5/0053* (2013.01); *H04L 5/0082* (2013.01); *H04L 5/0094* (2013.01); *H04L 5/001* (2013.01); *H04L 5/0023* (2013.01); *H04W 72/042* (2013.01)

(58) Field of Classification Search
CPC .................................................... H04W 36/00
See application file for complete search history.

(56) References Cited

U.S. PATENT DOCUMENTS

| | | |
|---|---|---|
| 2009/0088148 A1 | 4/2009 | Chung et al. |
| 2009/0168922 A1 | 7/2009 | Malladi et al. |
| 2009/0209247 A1 | 8/2009 | Lee et al. |
| 2009/0238091 A1 | 9/2009 | Kim et al. |
| 2009/0245187 A1 | 10/2009 | Nam et al. |
| 2009/0298493 A1 | 12/2009 | Lin |

(Continued)

FOREIGN PATENT DOCUMENTS

| | | |
|---|---|---|
| CN | 102123014 A | 7/2011 |
| EP | 2104294 A2 | 9/2009 |

(Continued)

OTHER PUBLICATIONS

Office Action dated Feb. 27, 2013; U.S. Appl. No. 13/626,595, filed Sep. 25, 2012; 21 pages.

(Continued)

*Primary Examiner* — John Blanton
(74) *Attorney, Agent, or Firm* — Conley Rose, P.C.; J. Robert Brown, Jr.

(57) ABSTRACT

A method is provided for communication in a wireless telecommunication system. The method comprises designating, by a network element, a first set of time-frequency resources for transmitting a first set of downlink control channels for a plurality of UEs, wherein the first set of time-frequency resources is known to the plurality of UEs, and wherein the first set of time-frequency resources varies from a first time interval to a second time interval. The method further comprises mapping, by the network element, a first downlink control channel to the first set of time-frequency resources. The method further comprises transmitting, by the network element, the first downlink control channel together with a downlink data channel in a frequency-division multiplexing manner.

24 Claims, 22 Drawing Sheets

(56) References Cited

U.S. PATENT DOCUMENTS

| | | | |
|---|---|---|---|
| 2010/0159935 A1 | 6/2010 | Cai et al. | |
| 2010/0172308 A1 | 7/2010 | Nam et al. | |
| 2010/0195583 A1 | 8/2010 | Nory et al. | |
| 2010/0322154 A1 | 12/2010 | Chen et al. | |
| 2011/0034175 A1 | 2/2011 | Fong et al. | |
| 2011/0070845 A1 | 3/2011 | Chen et al. | |
| 2011/0075624 A1* | 3/2011 | Papasakellariou et al. | ... 370/329 |
| 2011/0103292 A1 | 5/2011 | Pasad et al. | |
| 2011/0103296 A1 | 5/2011 | Ji et al. | |
| 2011/0149903 A1 | 6/2011 | Krishnamurthy et al. | |
| 2011/0170496 A1 | 7/2011 | Fong et al. | |
| 2011/0205948 A1 | 8/2011 | Chen et al. | |
| 2011/0206014 A1 | 8/2011 | Lee et al. | |
| 2011/0255485 A1* | 10/2011 | Chen et al. | ...... 370/329 |
| 2011/0274066 A1 | 11/2011 | Tee et al. | |
| 2012/0021756 A1* | 1/2012 | Kwon et al. | ...... 455/450 |
| 2012/0044896 A1 | 2/2012 | Kwon et al. | |
| 2012/0120868 A1 | 5/2012 | Park et al. | |
| 2013/0039284 A1* | 2/2013 | Marinier et al. | ...... 370/329 |
| 2013/0039291 A1 | 2/2013 | Blankenship et al. | |
| 2013/0083666 A1 | 4/2013 | Gaal | |
| 2013/0083750 A1 | 4/2013 | Nazar et al. | |
| 2013/0114529 A1 | 5/2013 | Chen et al. | |
| 2013/0155974 A1 | 6/2013 | Papasakellariou et al. | |
| 2013/0194931 A1* | 8/2013 | Lee et al. | ...... 370/241 |
| 2013/0195020 A1* | 8/2013 | Frederiksen et al. | ...... 370/329 |
| 2013/0201926 A1 | 8/2013 | Nam et al. | |
| 2013/0215842 A1 | 8/2013 | Han et al. | |
| 2013/0294366 A1 | 11/2013 | Papasakellariou et al. | |

FOREIGN PATENT DOCUMENTS

| | | |
|---|---|---|
| WO | 2011032035 A2 | 3/2011 |
| WO | 2011099722 A3 | 8/2011 |
| WO | 2011137383 A1 | 11/2011 |

OTHER PUBLICATIONS

PCT International Search Report; Application No. PCT/US2013/021428; Apr. 30, 2013; 3 pages.
PCT Written Opinion of the International Searching Authority; Application No. PCT/US2013/021428; Apr. 30, 2013; 4 pages.
Heo, Youn Hyoung, et al.; U.S. Appl. No. 13/545,525, filed Jul. 10, 2012; Title: Enhanced PHICH Transmission for LTE-Advanced.
3GPP TS 36.211 V10.1.0; 3rd Generation Parternship Project; Technical Specification Group Radio Access Network; Evolved Universal Terrestrial Radio Access (E-UTRA); Physical Channels and Modulation; Release 10; Mar. 2011; 103 pages.
3GPP TS 36.211 V10.2.0; 3rd Generation Partnership Project; Technical Specification Group Radio Access Network; Evolved Universal Terrestrial Radio Access (E-UTRA); Physical Channels and Modulation; Release 10; Jun. 2011; 103 pages.
3GPP TS 36.212 V10.1.0; 3rd Generation Partnership Project; Technical Specification Group Radio Access Network; Evolved Universal Terrestrial Radio Access (E-UTRA); Multiplexing and Channel Coding; Release 10; Mar. 2011; 76 pages.
3GPP TS 36.212 V10.2.0; 3rd Generation Partnership Project; Technical Specification Group Radio Access Network; Evolved Universal Terrestrial Radio Access (E-UTRA); Multiplexing and Channel Coding; Release 10; Jun. 2011; 78 pages.
3GPP TS 36.213 V10.1.0; 3rd Generation Partnership Project; Technical Specification Group Radio Access Network; Evolved Universal Terrestrial Radio Access (E-UTRA); Physical Layer Procedures; Release 10; Mar. 2011; 115 pages.
3GPP TS 36.213 V10.2.0; 3rd Generation Partnership Project; Technical Specification Group Radio Access Network; Evolved Universal Terrestrial Radio Access (E-UTRA); Physical Layer Procedures; Release 10; Jun. 2011; 120 pages.
3GPP TS 36.331 V10.1.0; 3rd Generation Partnership Project; Technical Specification Group Radio Access Network; Evolved Universal Terrestrial Radio Access (E-UTRA); Radio Resource Control (RRC); Protocol Specification; Release 10; Mar. 2011; 290 pages.
3GPP TSG RAN WG1 Meeting #67; "Aspects on DL and UL Control Channels for HARQ with Enhanced PDCCH"; R1-113921; San Francisco, USA; Nov. 10-14, 2011; 4 pages.
3GPP TSG-RAN WG1 #67; "Search Space for Enhanced Control Channels"; R1-113680; San Francisco; Nov. 14-18, 2011; 2 pages.
3GPP TSG RAN WG1 #67; "E-PDCCH Design Aspects"; R1-114029; San Francisco, USA; Nov. 14-18, 2011; 4 pages.
3GPP TSG-RAN WG1 #67; "Views on Enhanced PHICH"; R1-113682; San Francisco; Nov. 14-18, 2011; 1 page.
3GPP TSG RAN WG1 Meeting #67; "PHICH Enhancements"; R1-114067; San Francisco, USA; Nov. 14-18, 2011; 3 pages.
Vrzic, Sophie, et al.; U.S. Appl. No. 13/626,595, filed Sep. 25, 2012; Title: E-PDCCH Design for Reducing Blind Decoding.
Notice of Allowance dated Sep. 19, 2013; U.S. Appl. No. 13/626,595, filed Sep. 25, 2012; 16 pages.
Lindbom, Lars, et al.; "Enhanced Inter-Cell Interference Coordination for Heterogeneous Networks in LTE-Advanced: A Survey"; Dec. 7, 2011; 18 pages.
PCT International Search Report; Application No. PCT/US2013/029135; May 23, 2013; 3 pages.
PCT Written Opinion of the International Searching Authority; Application No. PCT/US2013/029135; May 23, 2013; 11 pages.
PCT International Search Report; Application No. PCT/US2013/032972; Jun. 6, 2013; 2 pages.
PCT Written Opinion of the International Searching Authority; Application No. PCT/US2013/032972; Jun. 6, 2013; 15 pages.
Office Action dated Apr. 17, 2014; U.S. Appl. No. 13/545,525, filed Jul. 10, 2012; 23 pages.
PCT International Preliminary Report on Patentability; Application No. PCT/US2013/021428; Apr. 16, 2014; 15 pages.
Office Action dated Sep. 26, 2014; U.S. Appl. No. 13/545,525, filed Jul. 10, 2012; 12 pages.
3GPP TSG RAN WG1 Meeting #67; "E-PDCCH Multiplexing and Link Level Evaluations"; R1-113744; San Francisco, USA; Nov. 14-18, 2011; 5 pages.
3GPP TSG RAN WG1 Meeting #67; "On the Structure and Usage Scenarios of ePDCCH"; R1-114300; San Francisco, USA; Nov. 14-18, 2011; 9 pages.
Final Office Action dated Feb. 23, 2015; U.S. Appl. No. 13/545,525, filed Jul. 10, 2012; 15 pages.
European Extended Search Report; Application No. 13738977.1; Mar. 20, 2015; 10 pages.
Taiwanese Office Action; Application No. 102109723; Jan. 29, 2015; 28 pages.
Advisory Action dated Jun. 19, 2015; U.S. Appl. No. 13/545,525, filed Jul. 10, 2012; 7 pages.
Notice of Allowance dated Aug. 5, 2015; U.S. Appl. No. 13/545,525, filed Jul. 10, 2012; 7 pages.

* cited by examiner

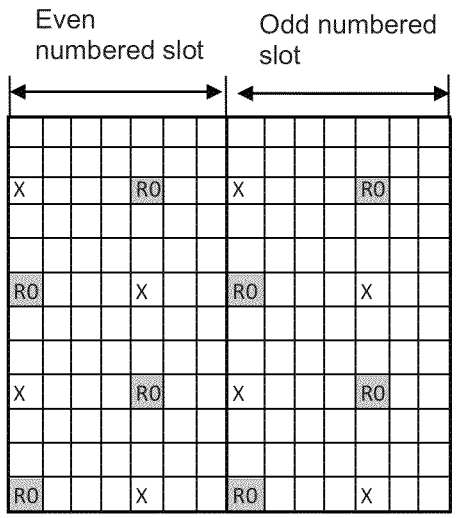 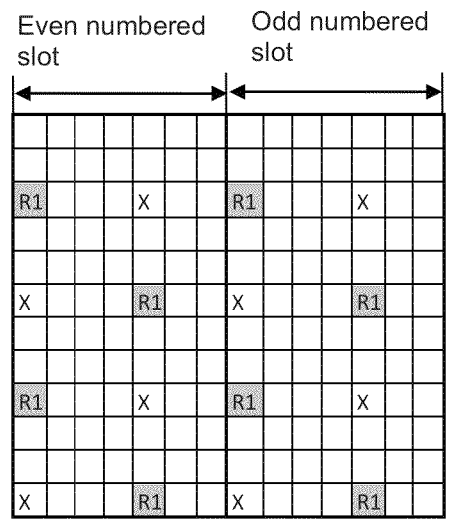
Figure 3 (prior art)
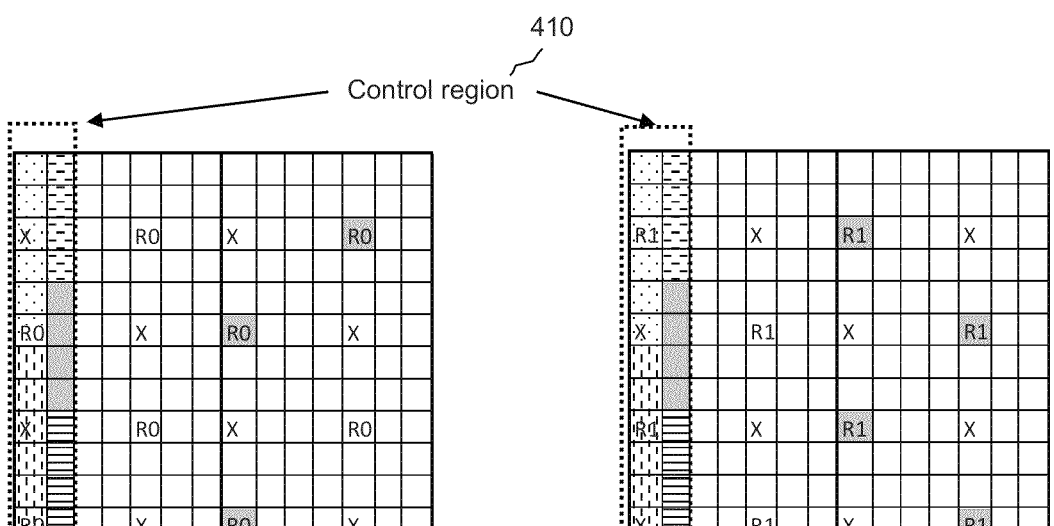
Figure 4 (prior art)

|     |                                              | Legacy Control Region (for PDCCH) | | Data Region (for E-PDCCH) | | Scenario Description |
| --- | -------------------------------------------- | --- | --- | --- | --- | --- |
|     |                                              | CSS | USS | CSS | USS |     |
| (a) | Component carrier of new carrier type with CFI=0 | No  | No  | No  | Yes | New carrier is always associated with a legacy component carrier. The UE always obtain broadcast/multicast info from CSS of legacy component carrier. |
| (b) |                                              | No  | No  | Yes | Yes | The UE can obtain fall-back UE-specific info from CSS of new component carrier. |
| (c) | Normal carrier (CFI>0)                       | Yes | Yes | No  | No  | • For Rel-8/9/10 UE, or<br>• when Rel-11 UE first powers up, or<br>• when Rel-11 UE is not configured with E-PDCCH |
| (d) |                                              | No  | No  | Yes | Yes | For the scenario where Rel-11 UE is configured to receive E-PDCCH only due to, e.g., high inter-cell interference in HetNet or to support low-cost MTC UE |
| (e) |                                              | Yes | No  | No  | Yes | For the scenario where Rel-11 UE is configured to detect E-PDCCH only for UE-specific info |
| (f) |                                              | Yes | Yes | No  | Yes | Split number of blind decodings of UE-specific info between PDCCH and E-PDCCH according to, e.g., DCI size; Use CSS in legacy control region for fall-back of UE-specific info |
| (g) |                                              | Yes | No  | Yes | Yes | Use CSS in legacy control region for broadcast/multicast info; Use CSS in data region for fall-back of UE-specific info |
| (h) |                                              | Yes | Yes | Yes | Yes | Split number of blind decodings of UE-specific info between PDCCH and E-PDCCH according to, e.g., DCI size; Use CSS in legacy control region for broadcast/multicast info; Use CSS in data region for fall-back of UE-specific info |

Table 1. CSS and USS combinations that a UE is expected to monitor

Figure 6

DMRS        CRS        REGs for E-PCFICH

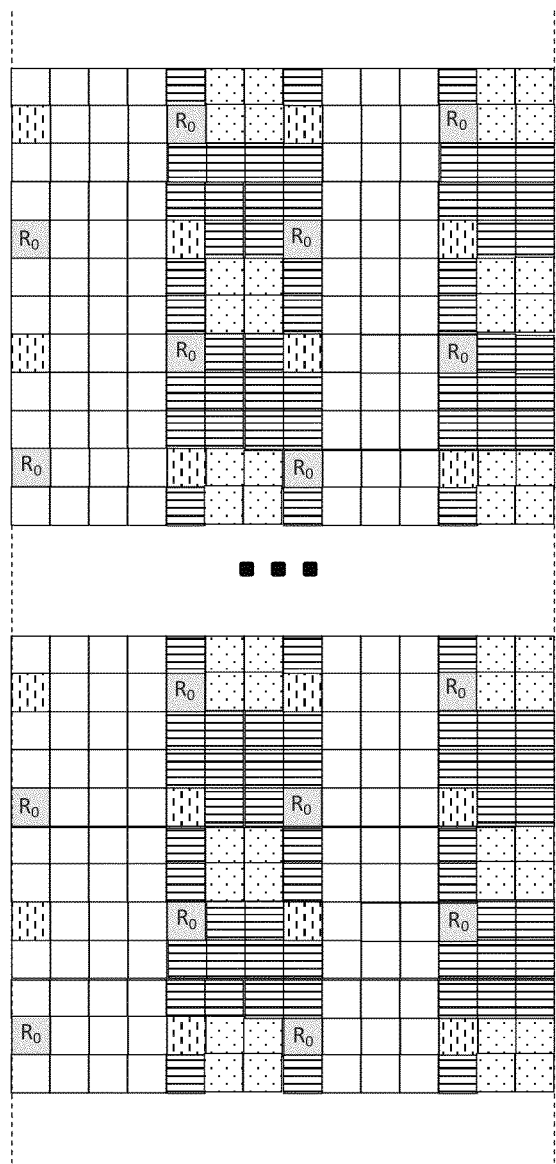
 DMRS
 $R_0$  CRS
 RE for potential E-PHICH
Figure 13

ENHANCED COMMON DOWNLINK CONTROL CHANNELS

CROSS-REFERENCE TO RELATED APPLICATIONS

The present application claims priority to U.S. Provisional Patent Application No. 61/612,804, filed Mar. 19, 2012 by Yufei Wu Blankenship, et al., entitled "Enhanced Common Downlink Control Channels" which is incorporated by reference herein as if reproduced in its entirety.

FIELD OF THE DISCLOSURE

The present disclosure relates to wireless telecommunications systems and more particularly to control channels in wireless telecommunications systems.

BACKGROUND

As used herein, the term "user equipment" (alternatively "UE") might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. Any such component will be referred to herein as an eNB, but it should be understood that such a component is not necessarily an eNB. Such a component may also be referred to herein as an access node.

LTE may be said to correspond to Third Generation Partnership Project (3GPP) Release 8 (Rel-8 or R8) and Release 9 (Rel-9 or R9), and possibly also to releases beyond Release 9, while LTE Advanced (LTE-A) may be said to correspond to Release 10 (Rel-10 or R10) and possibly also to Release 11 (Rel-11 or R11) and other releases beyond Release 10. As used herein, the terms "legacy", "legacy UE", and the like might refer to signals, UEs, and/or other entities that comply with LTE Release 10 and/or earlier releases but do not fully comply with releases later than Release 10. The terms "advanced", "advanced UE", and the like might refer to signals, UEs, and/or other entities that comply with LTE Release 11 and/or later releases. While the discussion herein deals with LTE systems, the concepts are equally applicable to other wireless systems as well.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is a diagram of a mapping of a cell-specific reference signal in a resource block in the case of two antenna ports at an eNB, according to the prior art.

FIG. 4 is a diagram of a resource element group allocation in a resource block in the first slot when two antenna ports are configured at an eNB, according to the prior art.

FIG. 6 is a table describing common search space and UE-specific search space combinations that a UE is expected to monitor, according to an embodiment of the disclosure.

FIG. 13 is a diagram of a distribution of an E-PHICH within a subframe, according to an embodiment of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Embodiments are described herein in the context of an LTE wireless network or system, but can be adapted for other wireless networks or systems.

In an LTE system, physical downlink control channels (PDCCHs) are used to carry downlink (DL) or uplink (UL) data scheduling information, or grants, from an eNB to one or more UEs. The scheduling information may include a resource allocation, a modulation and coding rate (or transport block size), the identity of the intended UE or UEs, and other information. A PDCCH could be intended for a single UE, multiple UEs or all UEs in a cell, depending on the nature and content of the scheduled data. A broadcast PDCCH is used to carry scheduling information for a physical downlink shared channel (PDSCH) that is intended to be received by all UEs in a cell, such as a PDSCH carrying system information about the eNB. A multicast PDCCH is intended to be received by a group of UEs in a cell. A unicast PDCCH is used to carry scheduling information for a PDSCH that is intended to be received by only a single UE.

Figure 1:
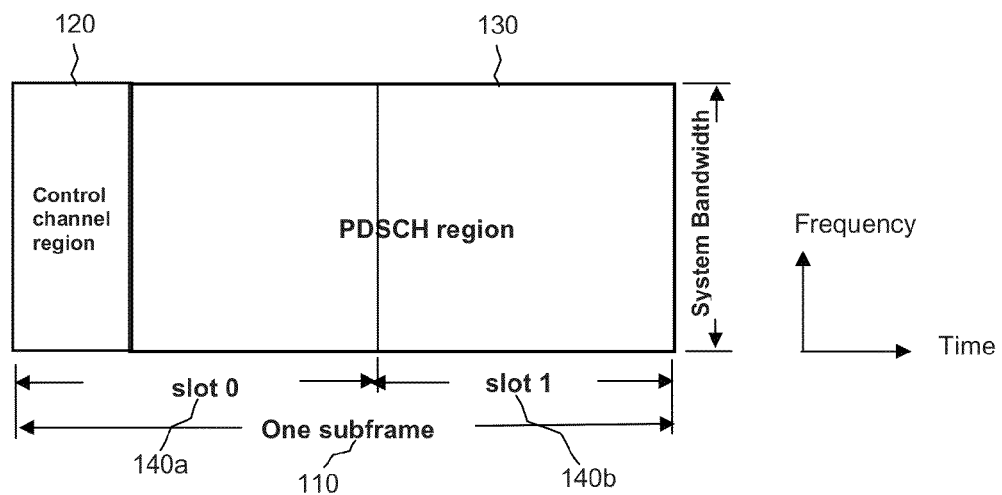
FIG. 1 is a diagram of a downlink LTE subframe, according to the prior art.

FIG. 1 illustrates a typical DL LTE subframe 110. Control information such as the PHICH (physical HARQ (hybrid automatic repeat request) indicator channel), PCFICH (physical control format indicator channel), and PDCCH are transmitted in a control channel region 120. The PHICH is used to transmit HARQ acknowledgements and negative acknowledgements (ACK/NACK), which may indicate whether the eNB has correctly received uplink scheduled data on the physical uplink shared channel (PUSCH).

The control channel region 120 includes the first few OFDM (orthogonal frequency division multiplexing) symbols in the subframe 110. The exact number of OFDM symbols for the control channel region 120 may be dynamically indicated by a control format indicator (CFI) in the PCFICH, which is transmitted in the first symbol. Alternatively, the number of OFDM symbols may be semi-statically configured when cross carrier scheduling is configured in the case of carrier aggregation in LTE Rel-10.

The PDSCH, PBCH (physical broadcast channel), PSC/SSC (primary synchronization channel/secondary synchronization channel), and CSI-RS (channel state information reference signal) are transmitted in a PDSCH region 130. DL user data is carried by the PDSCH channels scheduled in the PDSCH region 130. Cell-specific reference signals are transmitted over both the control channel region 120 and the PDSCH region 130, as described in more detail below.

Each subframe 110 can include a number of OFDM symbols in the time domain and a number of subcarriers in the frequency domain. An OFDM symbol in time and a subcarrier in frequency together define a resource element (RE). A physical resource block (physical RB or PRB) can be defined as, for example, 12 consecutive subcarriers in the frequency domain and all the OFDM symbols in a slot in the time domain. An RB or PRB pair with the same RB index in slot 0 (140a) and slot 1 (140b) in a subframe can be allocated together.

Figure 2:
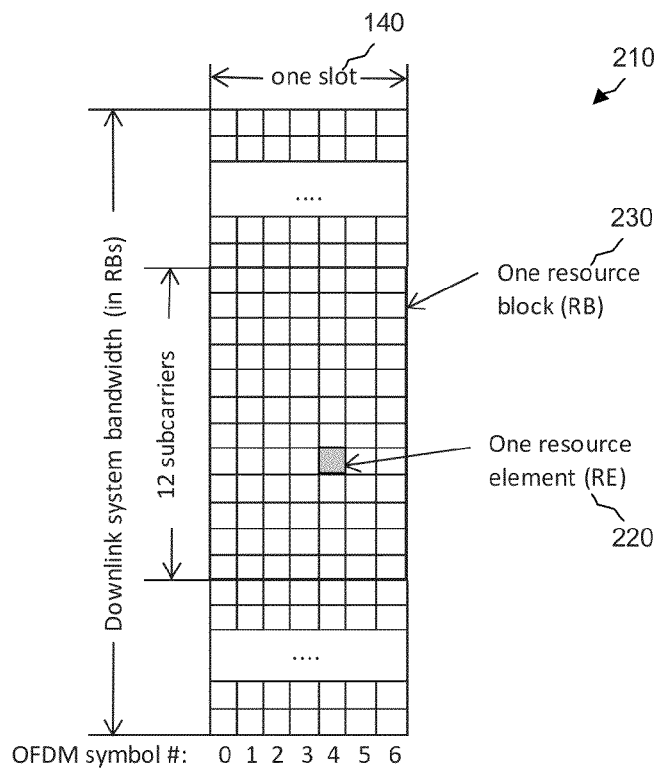
FIG. 2 is a diagram of an LTE downlink resource grid in the case of a normal cyclic prefix, according to the prior art.

FIG. 2 shows an LTE DL resource grid 210 within each slot 140 in the case of a normal cyclic prefix (CP) configuration. The resource grid 210 is defined for each antenna port, i.e., each antenna port has its own separate resource grid 210. Each element in the resource grid 210 for an antenna port is an RE 220, which is uniquely identified by an index pair of a subcarrier and an OFDM symbol in a slot 140. An RB 230 includes a number of consecutive subcarriers in the frequency domain and a number of consecutive OFDM symbols in the time domain, as shown in the figure. An RB 230 is the minimum unit used for the mapping of certain physical channels to REs 220.

For DL channel estimation and demodulation purposes, cell-specific reference signals (CRSs) can be transmitted over each antenna port on certain pre-defined time and frequency REs in every subframe. CRSs are used by Rel-8 to Rel-10 legacy UEs to demodulate the control channels. FIG. 3 shows an example of CRS locations in a subframe for two antenna ports 310a and 310b, where the RE locations marked with "R0" and "R1" are used for CRS port 0 and CRS port 1 transmission, respectively. REs marked with "X" indicate that nothing should be transmitted on those REs, as CRSs will be transmitted on the other antenna.

Resource element groups (REGs) are used in LTE for defining the mapping of control channels such as the PDCCH to REs. A REG includes either four or six consecutive REs in an OFDM symbol, depending on whether the CRSs are included. For example, for the two-antenna port CRSs shown in FIG. 3, the REG allocation in each RB is shown in FIG. 4, where the control region 410 includes two OFDM symbols and different REGs are indicated with different types of shading. REs marked with "R0" or "X" in FIG. 4a or with "R1" or "X" in FIG. 4b are reserved for CRSs for antenna port 0 and antenna port 1, and therefore only four REs in each REG are available for carrying control channel data.

A PDCCH can be transmitted on an aggregation of one or more consecutive control channel elements (CCEs), where one CCE consists of, for example, nine REGs. The CCEs available for a UE's PDCCH transmission are numbered from 0 to $n_{CCE}-1$.

The number of CCEs available in a subframe depends on the system bandwidth and the number of OFDM symbols configured for the control region. For example, in a 10 MHz system with three OFDM symbols configured for the control region and six groups configured for the PHICH, 42 CCEs are available for the PDCCH.

Multiple PDCCHs may be multiplexed in the control region in a subframe to support UL and DL data scheduling for one UE and to support DL and UL scheduling for more than one UE. For a given system bandwidth, the number of PDCCHs that can be supported in the control region also depends on the aggregation level used for each PDCCH. The aggregation level indicates how many CCEs are aggregated to carry a PDCCH. The aggregation level for a given target packet error rate is determined by the downlink received signal quality at a UE and the size of the downlink control information (DCI) to be carried by a PDCCH. In general, a high aggregation level is needed for a PDCCH intended for a UE that is at the cell edge and is far away from the serving eNB, or when a DCI with a large payload size is used.

The legacy PDCCH region in LTE may have capacity issues for some new applications or deployment scenarios where the number of scheduled UEs in a subframe could be large. Some examples include multiple user multiple input multiple output (MU-MIMO) transmission, coordinated multi-point (COMP) transmission, heterogeneous network (hetnet) deployment with remote radio heads (RRHs) in a cell sharing the same cell ID, and carrier aggregation (CA). With these deployment scenarios, there may be a need to enhance the capacity of the PDCCH.

Figure 5:
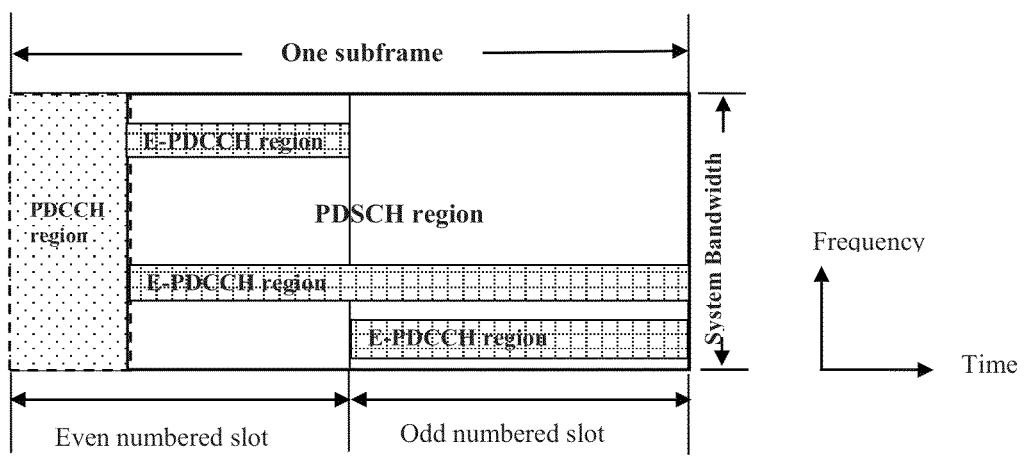
FIG. 5 is a diagram of E-PDCCH regions, according to an embodiment of the disclosure.

One approach for PDCCH capacity enhancement is to transmit DCI in the legacy PDSCH region. That is, some PRBs or PRB pairs in the traditional PDSCH region can be reserved for DCI transmission to UEs. Hereinafter, a physical downlink control channel transmitted in the legacy PDSCH region will be referred to as an extended or enhanced PDCCH (E-PDCCH). A set of RBs and OFDM symbols or PRB pairs reserved for this purpose can be referred to as an E-PDCCH region. The E-PDCCH region in a subframe is not necessarily completely filled with E-PDCCHs in that some resources in the E-PDCCH region not used for E-PDCCH transmission can be assigned for PDSCH transmission. In addition, for some scenarios, the legacy PDCCH region may or may not be present in a subframe containing an E-PDCCH region. The time and frequency resources of an E-PDCCH region may be configurable. Examples of E-PDCCH regions are shown in FIG. 5.

With the introduction of the E-PDCCH, the other two downlink control channels, the PHICH and the PCFICH, may also exist in extended or enhanced forms, which may be referred to as the E-PHICH and the E-PCFICH, respectively. Several challenges may arise with regard to the E-PHICH and the E-PCFICH. First, E-PDCCH resource allocation in a subframe with an E-PCFICH may need to be dynamically indicated. That is, the presence of the E-PCFICH may need to be signaled to UEs, the location of the E-PCFICH may need to be specified and signaled to UEs, the E-PCFICH may need to be multiplexed with the E-PDCCH and the PDSCH, and the information content carried by the E-PCFICH may need to be determined. Second, a common search space in the E-PDCCH region may need to be defined. Third, inter-cell interference management for the E-PCFICH, E-PHICH, and E-PDCCH common search space may need to be considered. Fourth, the design and reuse of reference signals for E-PCFICH and E-PHICH demodulation may need to be considered. Fifth, ACK/NACK resources in the physical uplink control channel (PUCCH) for a corresponding uplink grant transmitted by the E-PDCCH may need to be determined.

Furthermore, in the legacy control region, a common search space (CSS) and a UE-specific search space (USS) that a Rel-8/9/10 UE is expected to monitor to detect the PDCCH have been defined. With the introduction of enhanced control channels in the data region, another set of CSS and USS may be defined for the E-PDCCH. In Table 1 in FIG. 6, the CSS and USS combinations that a UE is expected to monitor are shown. The table shows that there are multiple scenarios that may need a common search space for the E-PDCCH in the data region.

While these combinations show what an individual UE is expected to monitor, all other UEs do not necessarily monitor the same combinations for a given subframe. Thus, the embodiments disclosed herein may consider the prevailing scenario where a CSS is defined in the data region. This may correspond to any scenario in Table 1 where a CSS of a data region is marked 'Yes'. Whenever a legacy control region is mentioned, it may be assumed that the carrier is a normal carrier with CFI greater than 0.

Since the CSS is shared by multiple UEs, the CSS may need to reside in a predefined common resource area. Over the common resource area, other downlink channels such as the E-PCFICH and the E-PHICH may be multiplexed in. Thus, the embodiments disclosed herein may cover a range of issues related to such a common resource area, including how the E-PCFICH and the E-PHICH may be multiplexed with the E-PDCCH, how the REs are allocated to the control channels, and other topics.

Embodiments of the present disclosure may also provide E-PDCCH/E-PHICH/E-PCFICH designs for subframes that may not contain the legacy PDCCH region. The embodiments may also enable UEs that are not capable of monitoring the legacy PHICH and PDCCH to receive control information from an eNB. Some embodiments may have a context in which the component carrier where the PDSCH is transmitted does not use cross-carrier scheduling. The PDSCH may be scheduled by the control channel of the same component carrier. To avoid decoding two PCFICH instances, for cross-carrier scheduled transmissions, the start of the data region may not be obtained from the PCFICH on that component carrier, but may be configured on a semi-static basis via radio resource control (RRC) signaling. Also, in some contexts, when a common search space is discussed, it may be assumed that the component carrier is the primary component carrier for the UE under consideration. The common search space may only be defined for transmissions on the primary component carrier.

An application example where the embodiments described herein may apply is the case of a new carrier type in a carrier aggregation scenario where, to reduce overhead, there is no legacy PDCCH region defined on the new carrier. Another application example where the embodiments may apply is in the support of machine type communication (MTC), wherein a UE may not be required to receive signals over the entire bandwidth and thus may not receive the entire legacy control region. Another application example where the embodiments may apply is the case of a victim cell in a heterogeneous network scenario. For example, if strong interference from an aggressor cell makes it difficult to receive the signal in part of the legacy control region, then the UE may receive downlink control information via E-PDCCH/E-PHICH/E-PCFICH instead.

More specifically, at least six sets of embodiments are provided herein to deal with enhanced common downlink control channels. A first set of embodiments deals with E-PCFICH resource allocation and signaling, a second set of embodiments deals with E-PHICH resource allocation and configuration, a third set of embodiments deals with a common search space in the E-PDCCH, a fourth set of embodiments deals with coordination of E-PDCCH allocation with fixed signals, a fifth set of embodiments deals with coordination in E-PDCCH allocation between neighbor cells or transmission points, and a sixth set of embodiments deals with PUCCH resource mapping.

In the first set of embodiments, resource allocation and signaling of an E-PCFICH are provided so that an advanced UE can detect the E-PCFICH (when configured) from a predefined region without excessive delay. In an embodiment, a master information block (MIB) may be used for E-PCFICH indication in a cell. This may inform an advanced UE whether or not an E-PCFICH is present in a cell. In an embodiment, if an E-PCFICH is present, a cell ID and/or subframe-dependent E-PCFICH resource allocation within a subframe may be predefined without any signaling. In an embodiment, an E-PDCCH resource in a subframe may be signaled through an E-PCFICH in either the same subframe or a previous subframe. In an embodiment, the detection of a common search space in an E-PDCCH may be activated via RRC signaling.

The E-PCFICH can carry parameters that define the shared E-PDCCH control region so that the scheduling of the E-PDCCH can be changed dynamically. It may be expected that such a shared E-PDCCH control region would use cross-interleaving, where E-PDCCHs from multiple UEs are interleaved and multiplexed together. In the following discussion, such a region is referred to as a cross-interleaving region.

When cross-interleaving is used for multiplexing of multiple E-PDCCHs, the PRB pairs allocated for the E-PDCCH cannot be used by the PDSCH. This can lead to resource waste if the resources provisioned for PRBs exceed the actual E-PDCCHs to be carried for a given subframe. For example, if the subframe needs to support one UE, then at most two E-PDCCHs are needed for UE-specific signaling, one for downlink scheduling assignments, one for uplink scheduling grants. If the subframe needs to support 10 UEs, then up to 20 E-PDCCHs are needed for UE-specific signaling. Thus, the number of PRB pairs needed to support 10 UEs is much greater than the number of PRB pairs needed to support one UE. Therefore, a balance between E-PDCCH capacity and overhead may need to be made. In this case, the E-PCFICH may be useful to dynamically indicate the E-PDCCH allocation in each subframe based on the actual number of UEs to be scheduled. This may reduce overhead and increase overall efficiency of resource utilization.

If the E-PCFICH is used for dynamic indication of the E-PDCCH cross-interleaving region in a subframe, then the E-PCFICH may need to be detected first, independently of other information. The E-PCFICH may need to be transmitted over known resources, with a known transmit format, and its resource location within a subframe may in principle be independent of the E-PDCCH allocation. In other words, it may be desirable to have a preconfigured allocation for the E-PCFICH in each subframe, where the preconfigured allocation is known to all UEs configured to monitor the E-PCFICH. However, allocating one or more PRBs or PRB pairs exclusively for the E-PCFICH may introduce too much overhead. To reduce E-PCFICH overhead and also to increase frequency diversity, the E-PCFICH may be multiplexed with the E-PDCCH. That is, the E-PCFICH may share some of the PRBs or PRB pairs configured for the E-PDCCH. For example, a region for interleaved E-PDCCHs can be predefined, and the E-PCFICH can be allocated to the first one or the first few OFDM symbols of the interleaved region. Additionally, the E-PCFICH can be distributed over a wide frequency range to obtain frequency diversity.

The E-PCFICH may need to rely on a certain type of common reference signal for channel estimation, where the reference signal can be used by multiple UEs. Such a common reference signal may be a local common reference signal. For example, the common reference signal may be defined for the interleaved region only, which is in contrast to the CRS which is common to an entire cell covering the entire spectrum. These local common reference signals may be received as demodulation reference signals (DMRS) for the E-PCFICH by the UEs.

Figure 7:
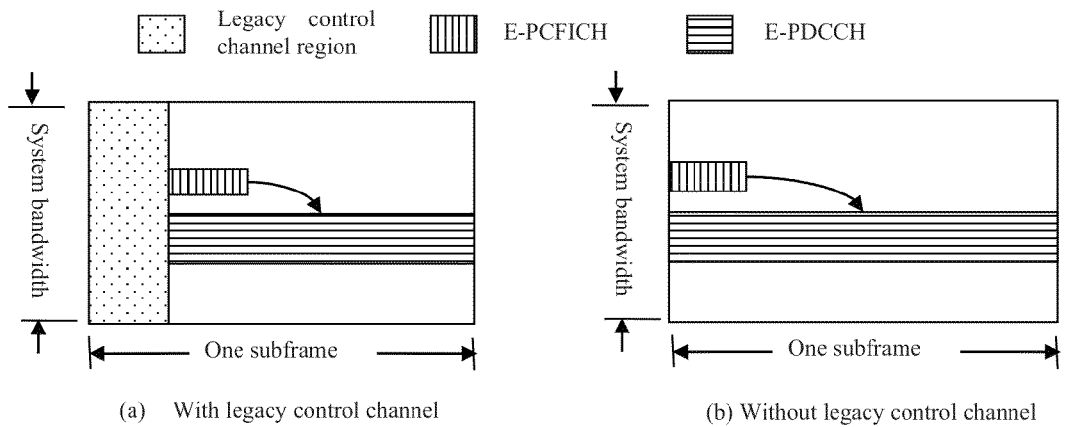
FIG. 7 is a diagram of an E-PCFICH and an E-PDCCH in the same subframe, according to an embodiment of the disclosure.

Time-wise, it may be desirable to have the E-PCFICH (if defined) located towards the beginning of the subframe, as shown in FIG. 7, so that the E-PCFICH can be decoded as early as possible. This may reduce the processing delay of the E-PDCCH and PDSCH decoding at the UE.

Figure 8:
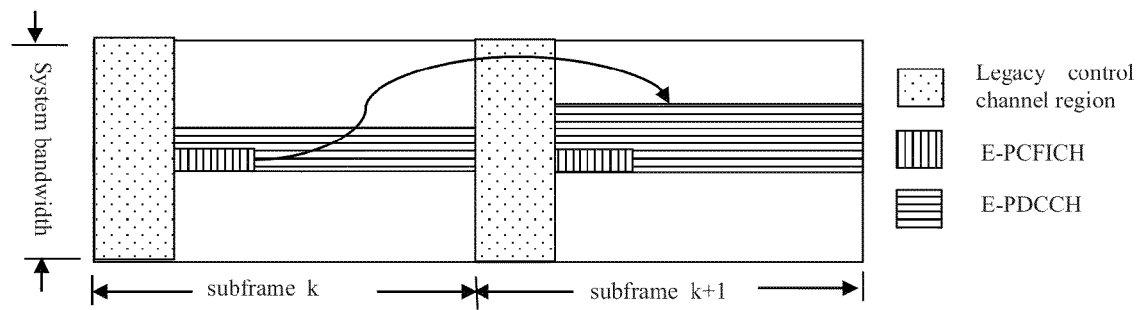
FIG. 8 is a diagram of an E-PCFICH and an E-PDCCH in different subframes, according to an embodiment of the disclosure.

Alternatively, an E-PDCCH region in a subframe may be indicated by an E-PCFICH in a previous subframe as shown in FIG. 8. With this option, the E-PDCCH region in a subframe may be determined at the start of the subframe and the E-PCFICH transmitted in the previous subframe may be allocated across the whole subframe without delay concern. In yet another option, which is a variant of the scheme shown in FIG. 8, the E-PCFICH in a subframe may be used for the configuration of the E-PDCCH regions starting in the next subframe. Such an E-PDCCH configuration may be assumed for the subsequent subframes until a new E-PCFICH is detected. Further, the periodicity and offset of an E-PCFICH transmission may be semi-statically defined, e.g., in units of subframe or radio frame. The UE may attempt detection of the E-PCFICH only in certain known time instances and skip E-PCFICH detection otherwise.

While these options provide benefits such as reduced E-PCFICH overhead and having the E-PCFICH available before a subframe is received, these options may have some impact on a UE in idle or DRX mode, where a legacy UE may need to be able to detect a possible DCI within a subframe period. So to support cross-subframe resource indication, the wakeup time for an advanced UE in idle or DRX mode may need to be increased to two or more subframe durations in order for the UE to detect a DCI. Alternatively, a DCI may always be transmitted in the legacy PDCCH region for advanced UEs in idle or DRX mode. Thus, the parameters of these options may need to be selected carefully to balance the benefits and drawbacks.

Figure 9:
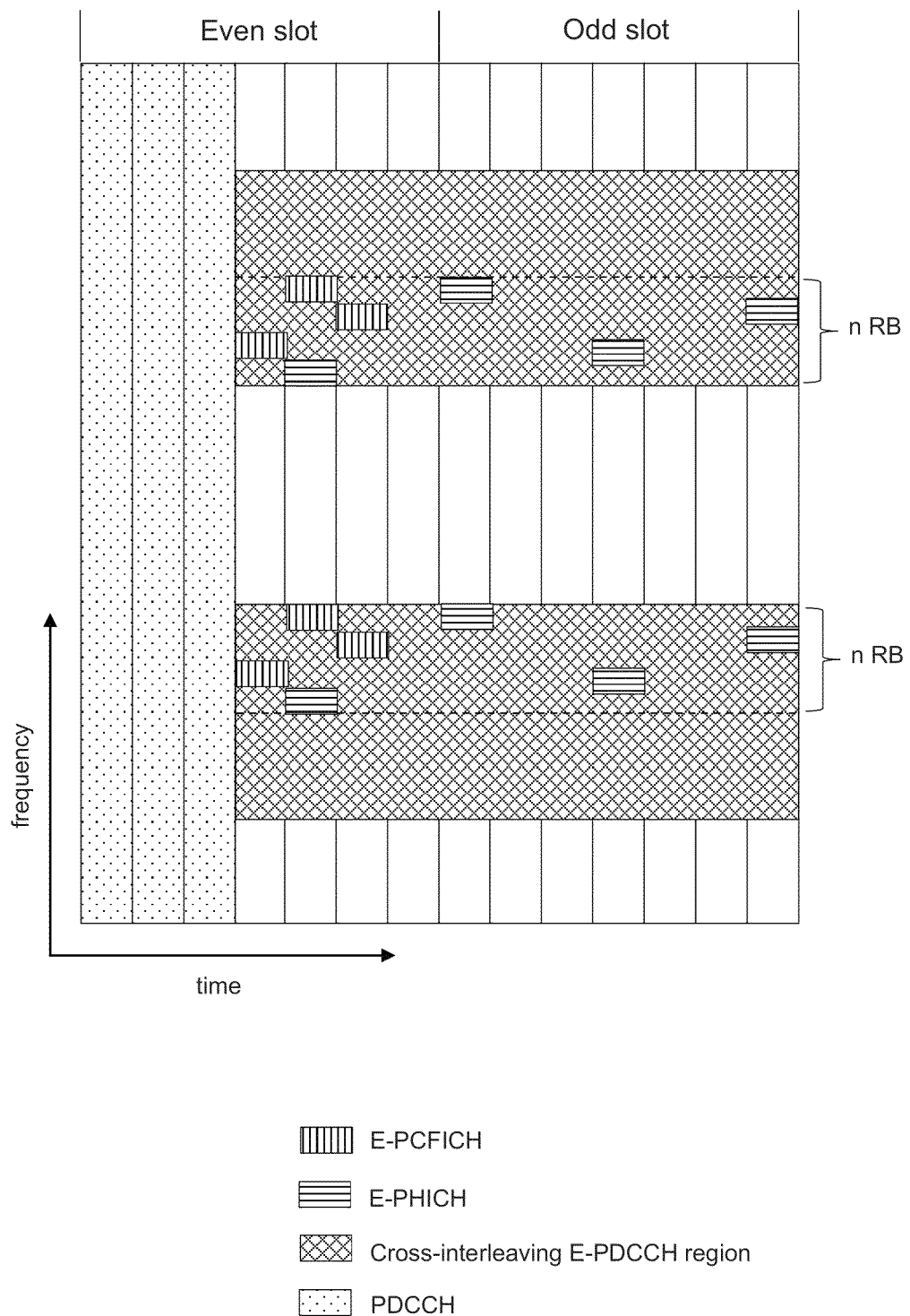
FIG. 9 is a diagram of an E-PCFICH and an E-PDCCH in the same subframe, according to an embodiment of the disclosure.

Frequency-wise, the E-PCFICH may need to be located in predefined PRBs, possibly a subset of PRBs that are occupied by the E-PDCCH region with cross-interleaving. This is illustrated in FIG. 9, where it is assumed that the E-PCFICH resides within two known PRB segments, each with n RBs, in the cross-interleaving E-PDCCH region. Moreover, the two known PRB segments are not contiguous in frequency so that frequency diversity can be obtained. Here, integer n is smaller than or equal to half the number of total PRBs occupied by the cross-interleaving E-PDCCH region. For completeness, FIG. 9 illustrates the legacy PDCCH (assuming it exists) and the E-PHICH as well.

As an example, to provide the known PRB segments, it can be defined that the upper frequency segment starts at a PRB with index:

$$\lfloor N_{PRB}^{tot}/2 \rfloor + \Delta_{offset} + N_{PRB}^{segment} \times ((Y_k \bmod(N_{PRB}^{common}/(2 \cdot N_{PRB}^{segment})))), \qquad (1)$$

and that the lower frequency segment starts at a PRB with index:

$$\lfloor N_{PRB}^{tot}/2 \rfloor - \Delta_{offset} - N_{PRB}^{segment} \times ((Y_k \bmod(N_{PRB}^{common}/(2 \cdot N_{PRB}^{segment}))) + 1), \qquad (2)$$

Figure 10:
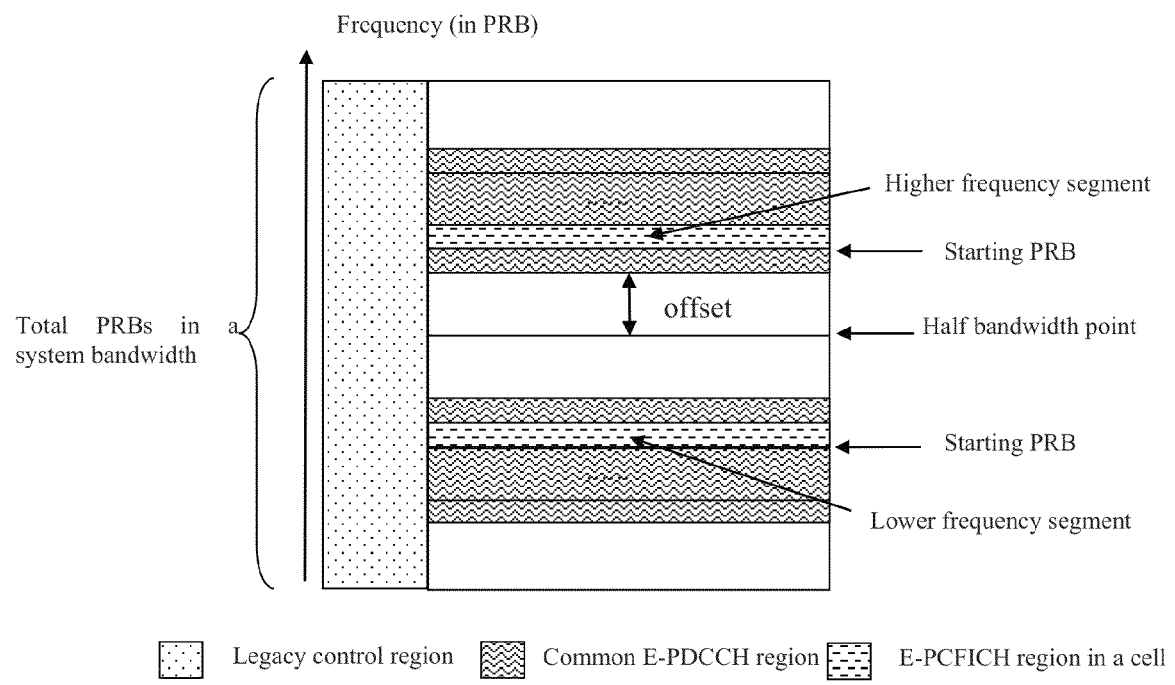
FIG. 10 is a diagram of an example of predefined E-PCFICH segments in a cell, according to an embodiment of the disclosure.

Here it is assumed that the PRBs are numbered from 0 to $N_{PRB}^{tot}-1$. Variable $N_{PRB}^{segment}$ is the number of PRBs in a segment, and there are two segments of equal size. $N_{PRB}^{tot}$ is the total number of PRBs for the cell, $N_{PRB}^{common}$ is the number of PRBs that can be used for the cross-interleaving region of the E-PDCCH, $N_{PRB}^{common} \leq N_{PRB}^{tot}$ and $N_{PRB}^{common}$ is a multiple of $(2 \cdot N_{PRB}^{segment})$. Variable $\Delta_{offset}$, where $\Delta_{offset} \geq 0$ and $\Delta_{offset} \leq \lfloor N_{PRB}^{tot}/2 \rfloor - N_{PRB}^{common}/2$, is the segment offset in units of PRBs, which measures the distance between the first segment and the center of the bandwidth. In particular, when $\Delta_{offset} > 0$, the higher and lower frequency segments are guaranteed to be separated by at least $2 \times \Delta_{offset}$ in frequency. The variables needed to define the segments, $N_{PRB}^{common}$, $N_{PRB}^{segment}$, $\Delta_{offset}$ may be predefined or provided via RRC signaling through the legacy PDCCH. The variable $Y_k$ is defined by $$Y_k = (A \cdot Y_{k-1}) \bmod D \quad (3)$$

where $Y_{-1} = N_{ID}^{cell}$ is the cell ID ranging from 0 to 503, $A=39827$, $D=65537$ and $k=\lfloor n_s/2 \rfloor$. $n_s$ is the slot number within a radio frame. The concept is shown in FIG. 10.

While the example describes using two segments equally spaced with respect to the center of the bandwidth, other schemes are possible to predefine resources known to both the eNB and the UE. For example, the scheme can be two segments defined with respect to the edges of the bandwidth. In another example, the scheme can be $N_{seg}$ segments evenly spaced starting from the lower PRB index, where $N_{seg}$ is an integer. In yet another example, the scheme can be $N_{seg}$ segments evenly spaced starting from the higher PRB index.

Figure 11:
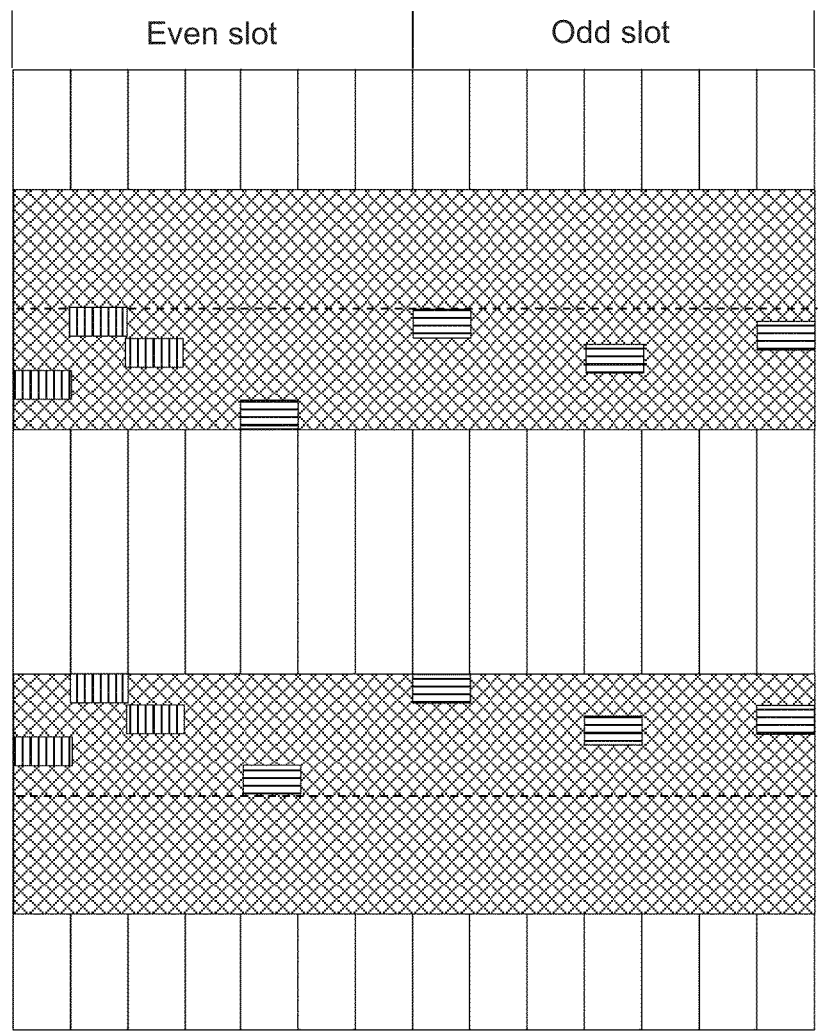
FIG. 11 is a diagram of a cross-interleaving E-PDCCH region when there is no legacy PDCCH, according to an embodiment of the disclosure.

If an advanced carrier has no legacy PDCCH region, then the cross-interleaving E-PDCCH region can span the entire subframe time-wise as shown in FIG. 11.

The presence of an enhanced control channel such as the E-PCFICH may need to be signaled to a UE. If the legacy PDCCH is present and the UE is able to receive control information over the legacy PDCCH, the UE may receive the control signal in the legacy PDCCH region first. The presence of the E-PCFICH and its resource allocation may then be semi-statically signaled. For some UEs, such as a UE with MTC, the E-PCFICH may need to be signaled before any RRC signaling, since MTC UEs may not have the capability to detect the signal in the whole legacy control region. One possibility is for the presence of the E-PCFICH to be indicated in the MIB, which is carried over the PBCH.

At least two options exist for multiplexing the E-PCFICH with the PDSCH. In frequency division multiplexing (FDM) or PRB pair-based multiplexing, the E-PCFICH may be allocated within one or multiple PRB pairs. In combined FDM and time division multiplexing (TDM) or PRB-based multiplexing, the E-PCFICH may be allocated within one or multiple PRBs in the first slot. Only the PDSCH for advanced UEs can be multiplexed with the E-PCFICH in this case. When E-PCFICH is transmitted in the PRBs that are also used for E-PDCCH transmission, then the multiplexing of the E-PCFICH with the PDSCH follows how the E-PDCCH is multiplexed with the PDSCH.

At least three options exist for signaling the E-PCFICH resource allocation to UEs. In a first option, E-PCFICH resources are predefined in common locations for all cells. In this case, no signaling is needed, but there could be inter-cell interference issues. In a second option, E-PCFICH resources are predefined as a function of cell ID and perhaps subframe number. This option is illustrated in the example of FIG. 10. In a third option, E-PCFICH resources are RRC signaled. This option assumes that the legacy PDCCH is present and that all UEs are capable of receiving downlink and uplink grants in the legacy PDCCH region.

For CoMP scenario 4, if only parameters common to the transmission points (TPs) are used in defining the E-PCFICH resource (e.g., cell ID, subframe number), the same E-PCFICH resource location may be used for all TPs in a cell. To further separate out E-PCFICHs for the TPs of the same cell, additional parameters and resource dimensions may be used, such as using code division multiplexing (CDM) to multiplex the E-PCFICHs of the TPs. Alternatively, TP-specific parameters such as those related to CSI-RS configuration for the TP could be used to create shifts for the E-PCFICH resources for each TP.

Figure 12:
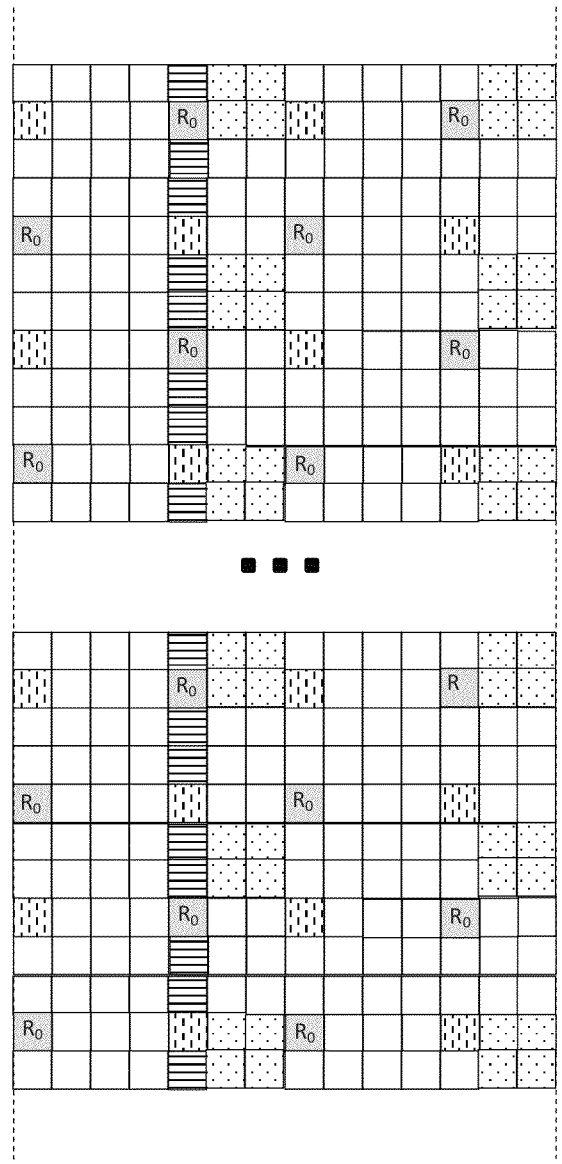
FIG. 12 is a diagram of a distribution of an E-PCFICH within a subframe, according to an embodiment of the disclosure.

To ensure higher estimation reliability, it may be desirable to allocate the E-PCFICH to REs that are adjacent to the REs for a reference signal, as shown in FIG. 12.

The information carried in the E-PCFICH may be different from that in the PCFICH. In the legacy PCFICH, two bits are used to generate four states (with one state being reserved), which indicates the number of OFDM symbols for the control region. In the case of the E-PCFICH, to specify the RB locations of the E-PDCCH, a full-scale resource allocation may be needed for more flexibility. The number of bits needed depends on both bandwidth and resource allocation type. For a 20 MHz bandwidth, 25 bits are needed for resource allocation type 0/1, and 13 bits are needed for resource allocation type 2. This is quite large compared to the PCFICH, and substantial resources may be consumed in order to reach all UEs in a cell. It is effectively equivalent to sending a DCI. To achieve the same bit error rate (BER) as the PCFICH, four to eight CCEs may be needed, similar to DCI 1A/1C transmission in the common search space of the legacy PDCCH, which is equivalent to two to three distributed RB pairs. Such resource consumption may be excessive compared to the PCFICH.

Thus, simpler information may need to be defined for the E-PCFICH. For example, the E-PCFICH may take four values (e.g., 1, 2, 3, 4), each indicating a different number of PRBs relative to an anchor PRB position. The anchor PRB may be either predefined or RRC signaled. To be more specific, these four values may represent four states, each indicating a subset of the E-PDCCH resources configured by RRC signaling and indicating the number of PRBs and their locations. In one example, values of {1, 2, 3, 4} may represent, respectively, that ¼, ½, ¾, or 1 portion of the E-PDCCH resources configured by RRC are used in the current subframe for the actual E-PDCCH. The locations of these PRBs may be predefined, and the principle used to select such PRBs may be that they are evenly spread in the frequency domain to gain frequency diversity. For example, if RRC configures 10 PRBs as E-PDCCH resources, the E-PCFICH taking the value "1" indicates that round(10/4)=2 PRBs are used in the current subframe for the E-PDCCH, and their logical index would be the first and sixth PRBs. In another example, the E-PCFICH taking the value "2" could mean that round(10× 2/4)=5 PRBs are used in the current subframe for the E-PDCCH, and their logical index would be first, third, fifth, seventh, and ninth. Similar meanings for E-PCFICH values of "3" and "4" can be formulated. With such definitions, only two bits are needed, and the E-PCFICH indicates those PRBs actually used in the current subframe for the E-PDCCH, while the remaining PRBs configured by RRC may be released for PDSCH transmission.

In another example, values of {1, 2, 3, 4} could represent that {N1, N2, N3, N4} PRB pairs are used for the E-PDCCH, where the actual PRBs indicated by {N1, N2, N3, N4} are a function of the bandwidth. The PRB pairs may be evenly spaced across the bandwidth, and their positions may be a function of the physical cell ID and/or the subframe index.

While in the above it is assumed that the E-PCFICH is transmitted, the E-PCFICH does not necessarily need to be transmitted. In the absence of the E-PCFICH, a UE may need to detect the cross-interleaving E-PDCCH region via other means. For UEs or carriers with a legacy PDCCH, the presence of the E-PDCCH region as well as the resource allocation of the region may be RRC signaled, either with UE-specific RRC signaling or as a broadcast to all UEs as part of the system information blocks (SIBs). For UEs that may not be able to decode a legacy PDCCH or for carriers that do not have a legacy PDCCH, the presence of an E-PDCCH region may need to be signaled in the MIB. If an E-PDCCH region is present, a predefined common search space within the E-PDCCH region may be used for transmitting all the downlink and uplink grants until a UE is configured with the rest of the E-PDCCH region for a UE-specific search space.

In general, this set of embodiments provides for transmitting a first downlink control channel over a first set of resource elements that are frequency-division multiplexed with downlink data channels and interleaved with a second set of resource elements. The second set of resource elements carries a second downlink control channel. The first downlink control channel carries configuration information for a second downlink control channel. The first set of resource elements may be known to a plurality of UEs.

More specifically, in an embodiment, an E-PCFICH channel is introduced in LTE to dynamically indicate the resource allocation of an E-PDCCH with a distributed transmission. The presence of an E-PCFICH may be indicated by an existing reserved bit in the MIB carried by the PBCH. The resources for the E-PCFICH may be predefined and known to a UE and may share a subset of PRB pairs configured for the E-PDCCH. The PRB pairs that contain the E-PCFICH may be FDM multiplexed with the PDSCH, and the locations of such PRB pairs may vary from cell to cell. The resources for the E-PCFICH may be allocated in the first slot of a subframe and may be close to the reference signals. The content of the E-PCFICH may consist of a bit string representing one of a number of predefined resource configurations. The E-PDCCH resource configuration indicated by the E-PCFICH may be for an E-PDCCH transmitted in the same subframe or for an E-PDCCH transmitted in a different subframe, such as a subsequent subframe.

A second set of embodiments disclosed herein deals with E-PHICH resource allocation and configuration for achieving good channel estimation performance. In an embodiment, the E-PHICH is mapped to REs close to DMRS REs. REG-to-RE mapping is provided to achieve transmit diversity of the E-PHICH.

With the introduction of the E-PDCCH, there may be a need to provide a high capacity to carry a large number of ACK/NACKs. Therefore, there may be a need to enhance the PHICH channel that carries ACK/NACKs. Such an enhanced PHICH channel can be referred to as an E-PHICH channel. Enhancement of the PHICH may be especially necessary considering uplink MU-MIMO and applications such as MTC. Unlike the relay backhaul link, the downlink ACK/NACK signal cannot be replaced by an uplink new or retransmission grant exclusively without a dedicated ACK/NACK channel, such as the PHICH, since a UE may not have relatively constant downlink data. The resource allocation requirements for the E-PHICH may need to be carefully selected in order for robust performance of the E-PHICH to be maintained. In an embodiment, the E-PHICH is distributed to OFDM symbols containing or near the local common DMRS or to OFDM symbols adjacent thereto. REs adjacent to the REs used for reference signal transmission may be allocated to carry downlink control information where high reliability is desired, such as the E-PHICH, since REs close to reference signals tend to have more reliable channel estimation information. As illustrated in FIG. 13, this may ensure good channel estimation performance for the E-PHICH.

In FIG. 13, it is assumed that a CSI-RS is not transmitted in the subframe. All REs in OFDM symbols {4, 5, 6, 7, 11, 12, 13} (highlighted with horizontal lines) that are not used as reference symbols are used for the E-PHICH. Thus, there are a total of 48 REs in a PRB pair available for the E-PHICH. If the E-PHICH uses the same bit-to-symbol processing as the PHICH, then each E-PHICH group occupies 12 REs, assuming a normal cyclic prefix. Thus, each PRB can transmit four E-PHICH groups. The same number of E-PHICH groups may be defined as for the PHICH. That is, $$N_{PHICH}^{group} = [N_g(N_{RB}^{DL}/8)], \text{ for normal cyclic prefix} \qquad (4)$$

where $N_{PHICH}^{group}$ is the number of PHICH groups and $N_g$ is a variable provided by higher layers. Then the number of PRBs the E-PHICH occupies is $N_{PHICH}^{group}/4$. Thus, the fraction of PRBs out of total PRBs that the E-PHICH will occupy is $$\frac{N_{PHICH}^{group}/4}{N_{RB}^{DL}} \approx N_g/32, \text{ for normal cyclic prefix} \qquad (5)$$

For an extended cyclic prefix, approximately the same fraction of PRBs is needed to carry the E-PHICH. Moreover, since the maximum value of $N_g$ is 2, the maximum fraction of PRBs occupied by the E-PHICH is 1/16. This would provide sufficient latitude for interference coordination between neighbor cells.

When the network is time division duplexed (TDD), and uplink-downlink configuration 0 is used, subframes #0 and #5 need twice as many E-PHICH groups as otherwise. Thus, the fraction of PRBs occupied by the E-PHICH is 1/8, which is still sufficient to avoid interference between two neighbor cells.

When a CSI-RS is transmitted in a subframe, the number of useful REs in an OFDM symbol {5, 6, 12, 13} will be reduced. In the worst case of eight CSI-RS ports, the number of REs usable to transmit the E-PHICH is reduced to 40 from 48. Still, each PRB can transmit three E-PHICH groups for a normal cyclic prefix. The fraction of PRBs that need to be assigned to carry the E-PHICH is approximately $N_g/24$, which is not excessive.

As the E-PHICH carries ACK/NACK information for multiple UEs, the demodulation of the E-PHICH may have to rely on reference signals shared by multiple UEs, such as un-precoded DMRS. This may make it difficult to multiplex the E-PHICH with other types of transmissions that use UE-specific reference signals, such as a PDSCH with beamforming or a UE-specific E-PDCCH. On the other hand, the E-PHICH can be easily multiplexed with an E-PDCCH that uses a shared reference signal that is of a cross-interleaved type and can carry common information. Even when a common search space does not exist in a subframe, there can still be UE-specific E-PDCCHs that are cross-interleaved and use a shared reference signal.

Similar to Rel-8 to Rel-10, an REG may be defined in each OFDM symbol allocated for the E-PHICH. In OFDM symbols that do not contain DMRS and/or CSI-RS, the same REG definition as in Rel-8 may be used. That is, an REG is composed of four consecutively available REs in one OFDM symbol in an RB configured for a potential E-PHICH, where an RE is assumed to be unavailable with respect to the mapping of the E-PHICH if it is used for transmission of CRS. If CRS is configured for port 0, it may be assumed that REs for transmission of CRS port 1 are also unavailable for the REG.

Precoded transmit diversity (TxD) symbols for 2-tx and 4-tx as defined in Rel-8 may be mapped within each REG.

In OFDM symbols containing DMRS and/or CSI-RS, the options described below may be used for REG definition. The REGs used for a particular downlink channel (e.g., E-PHICH) may then be selected using a predefined rule, such as a rule defined in Rel-8.

An REG is composed of four consecutively available REs in one OFDM symbol in an RB configured for potential E-PHICH transmission counted in ascending order of subcarriers. An RE is assumed to be unavailable with respect to mapping the E-PHICH if the RE is configured for transmission of a DMRS or if the RE is configured for a CSI-RS.

For an REG={RE($k_1$), RE($k_2$), RE($k_3$), RE($k_4$)}, where $k_i$ (i=1, 2, 3, 4) are the subcarrier indices of the REs, the following conditions may be satisfied, $$k_2-k_1=k_3=1 \qquad (6)$$

Figure 14:
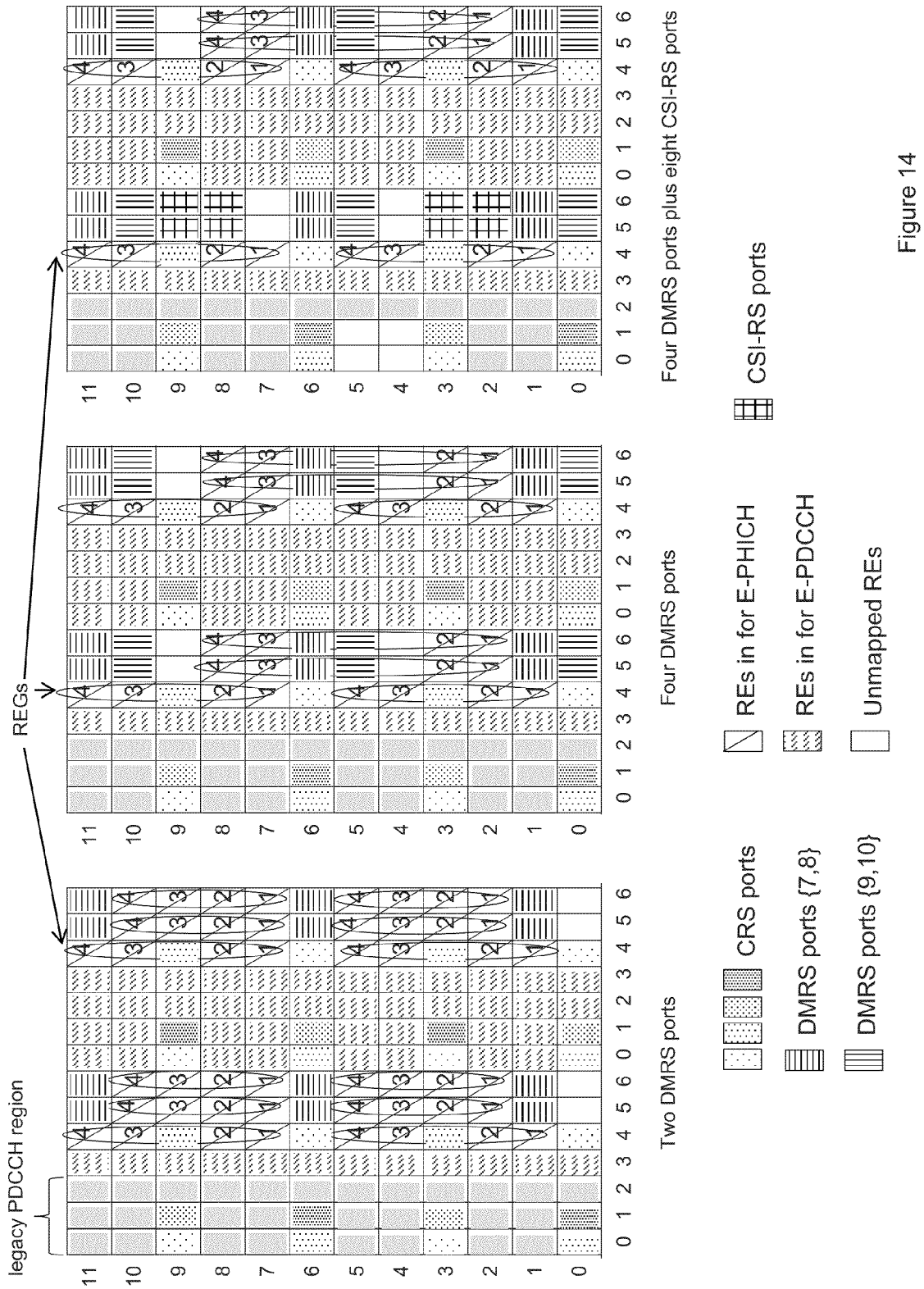
FIG. 14 is a diagram of REG to RE mapping in OFDM symbols configured for an E-PHICH, according to an embodiment of the disclosure.

That is, RE($k_1$) and RE($k_2$) are adjacent REs, as are RE($k_3$) and RE($k_4$). This condition may ensure that the propagation channels are approximately the same for each of the RE pairs, which is desirable for transmit diversity. One such example is shown in FIG. 14. This kind of mapping may be appropriate for the space frequency block code (SFBC) type of transmit diversity. While a CSI-RS is not included in FIG. 14, the same principle may apply for a subframe containing a CSI-RS.

To further maintain orthogonality between E-PHICHs within an E-PHICH group, the propagation channels over an REG should be approximately the same. For this purpose, further restrictions may be applied to an REG, such as $k_4-k_1<5$.

Alternatively, for REGs in OFDM symbols containing a DMRS and/or a CSI-RS and configured for potential E-PHICH transmission, an REG is composed of four neighboring available REs in an RB in two consecutive OFDM symbols containing a DMRS and/or a CSI-RS counted in ascending order of OFDM symbols first and then subcarriers. An RE is assumed to be unavailable with respect to mapping the E-PHICH if the RE is used for the transmission of a reference signal such as a DMRS or a CSI-RS.

Figure 15:
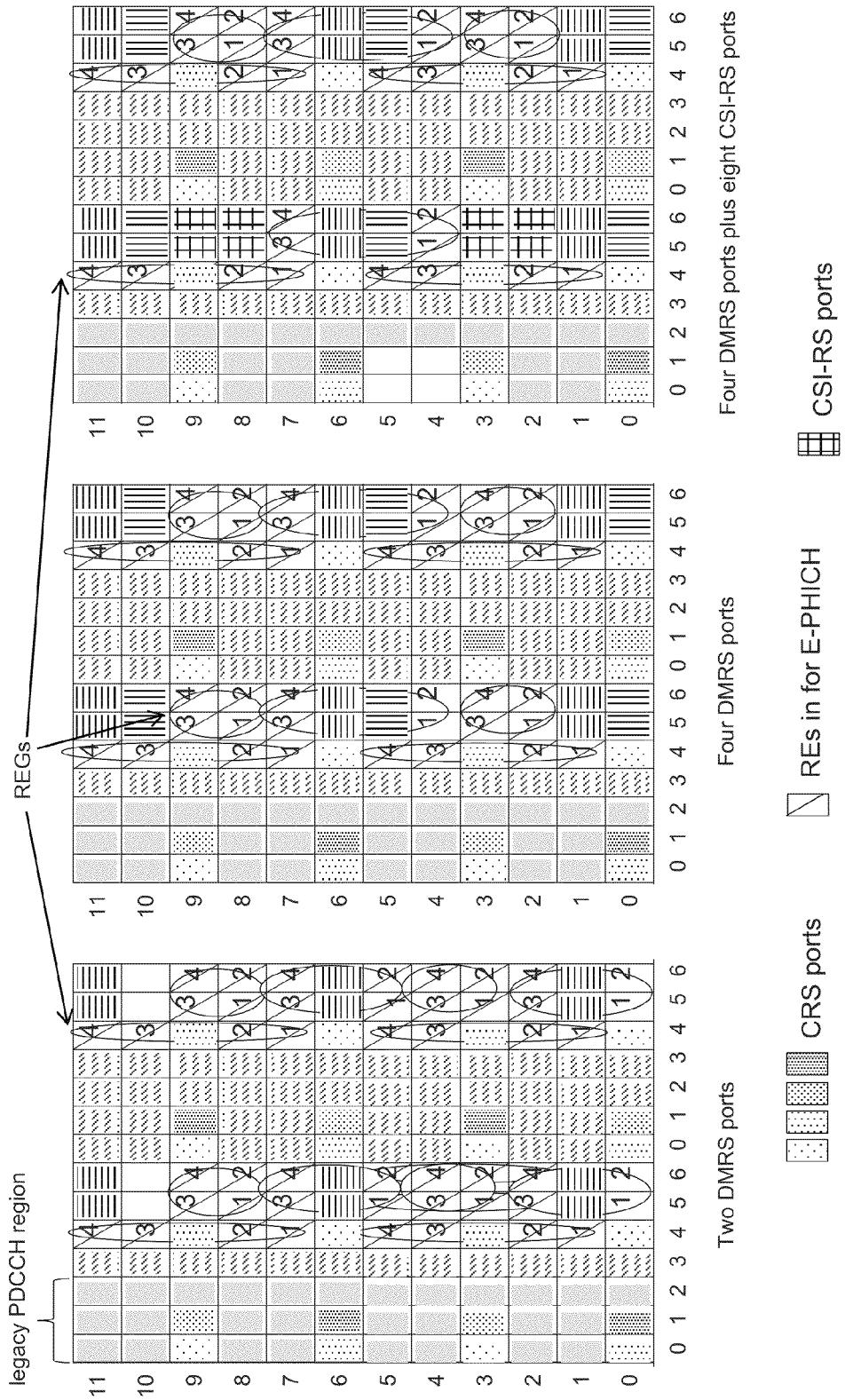
FIG. 15 is another diagram of REG to RE mapping in OFDM symbols configured for an E-PHICH, according to an embodiment of the disclosure.

One such example is shown in FIG. 15, where the following conditions are imposed for an REG={RE1, RE2, RE3, RE4}: RE1 and RE2 are adjacent REs, either in the frequency domain or the time domain; RE3 and RE4 are adjacent REs, either in the frequency domain or the time domain; and the maximum separation of the REs within an REG in the frequency domain is five REs.

With this type of mapping, the space time block code (STBC) type of transmit diversity may be needed in the OFDM symbols containing a DMRS and/or a CSI-RS, so a hybrid transmit diversity with SFBC and STBC may be needed.

With the above resource mapping, E-PHICHs may be multiplexed, scrambled, modulated, mapped to layers, and precoded in the same way as for the legacy PHICH except that transmit diversity uses DMRS ports for demodulation instead of CRS ports. The DMRSs in those RBs are shared by multiple UEs and thus should not be precoded.

In the above discussion, the legacy DMRS is used as an example for E-PDCCH and E-PHICH demodulation. Alternatively, new demodulation reference signals may be defined for the E-PDCCH and the E-PHICH. In general, the reference symbols for cross-interleaving the E-PDCCH region may need to be known to multiple UEs. That is, the reference symbols may not be specific to a single UE. Unlike a conventional CRS, these shared reference signals are only local common reference signals and do not need to be transmitted across the entire bandwidth.

For CoMP scenario 4, the shared reference signals may be TP-specific, so that all UEs attached to a same TP can access the E-PDCCH common search space specific to the given TP. Channel-independent precoding may be assumed by the UE for these shared reference signals.

Defining REGs of four REs for the PHICH may make it easy to support 4-tx TxD. This may also lead to the use of an orthogonal covering code (OCC) with a length of 4 to separate ACK/NACK signals in a CDM fashion in each PHICH group. In Rel-8, the PDCCH, the PHICH, and the PCFICH use the same REG as the basic unit and are all transmitted in the legacy PDCCH region, so it may be easy to map these kinds of REGs to the physical time-frequency resource grid.

In Rel-11 and beyond, the E-PHICH may be transmitted in the PDSCH region. Therefore, it may not be easy to map an REG of four REs to the physical time-frequency resource grid because the REs that are already used for other purposes, such as a DMRS or a CSI-RS, may need to be skipped. As seen from FIG. 14, some REs in an REG may be separated too far from each other after mapping, which may cause performance degradation due to the loss of orthogonality among OCC in the case of a highly frequency selective channel. To solve this issue, instead of using four REs per REG as discussed above, a modified E-PHICH group with a smaller size of REGs may be defined, where the new REG consists of two REs instead of four. Length-2 OCC may then be applied to each E-PHICH in an E-PHICH group in each of the three REGs. Either 2-tx or 4-tx transmit diversity with SFBC+FSTD may still be used.

The modified E-PHICH group consists of three REGs each with two REs, so each E-PHICH group could multiplex four ACK/NACK bits. The size of each E-PHICH group is reduced by half as compared with a Rel-8 PHICH group, so for the same given RE resources, the number of E-PHICH groups is doubled. This could maintain the overall E-PHICH capacity unchanged. The decoding of the E-PHICH may use the DMRS ports, and using two DMRS ports to support 2-tx TxD would cut the DMRS overhead by half as compared with using four DMRS ports to support 4-tx TxD. The performance gain of 4-tx TxD over 2-tx TxD as observed for a Rel-8 PDCCH is less than 1 dB, and this gain could be offset by the overhead reduction and other benefits of using 2-tx TxD. A smaller size REG for an E-PHICH group may avoid the loss of orthogonality of OCCs in certain REGs with four REs due to large separations of REs.

Figure 16:
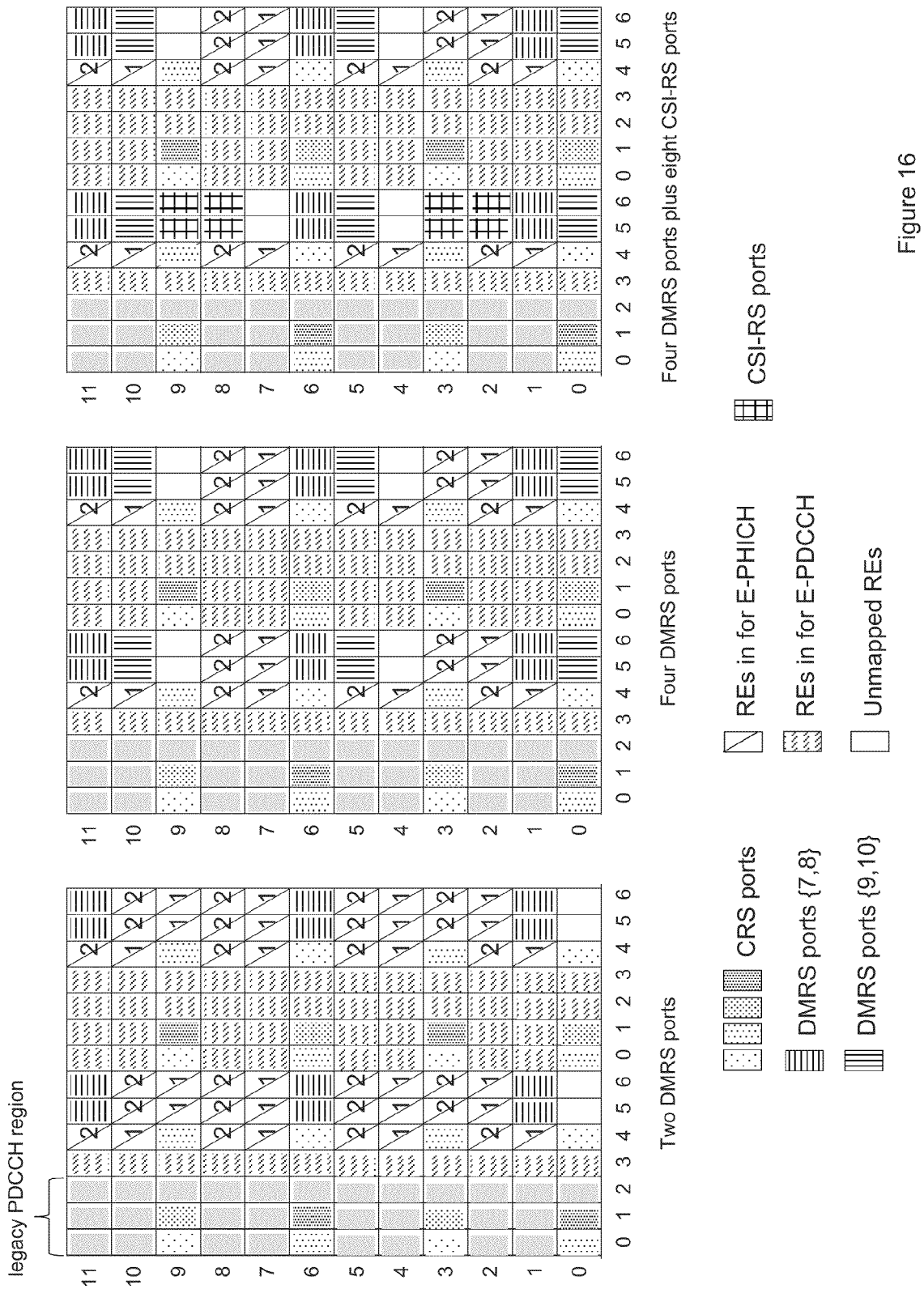
FIG. 16 is a diagram of mapping of a short REG for an E-PHICH, according to an embodiment of the disclosure.

FIG. 16 shows some examples of mapping such smaller size of REGs to the time-frequency grid, where "1" and "2" indicate the first and second REs in an REG. Compared with FIG. 14, there are no occasions where the REs in an REG are separated by two to three reserved REs.

For this modified E-PHICH, the derivation of the E-PHICH group index and OCC index in the E-PHICH group for an ACK/NACK from the particular UE may use the formulas from Rel-8, with a corresponding E-PHICH group number and $N_{SF}^{PHICH}=2$, which is the spreading factor of the OCC within each E-PHICH group.

In general, this set of embodiments provides for multiplexing the HARQ response signals of a plurality of UEs over the same time-frequency resources. The same time-frequency resources are frequency-division multiplexed with a data transmission. Configuration information regarding the time-frequency resources is signaled to the plurality of UEs before a HARQ response signal is transmitted.

More specifically, in an embodiment, the resources used for E-PHICH transmission may be allocated close to the DMRS ports for more accurate channel estimation. The REGs for the E-PHICH may be defined by consecutive REs on the same OFDM symbols or by neighboring REs on two consecutive OFDM symbols. The number of REs in each REG may be two or four. 2-tx or 4-tx transmit diversity schemes may be used to transmit the E-PHICH. While here an REG of size 2 or 4 has been used as an example of a resource allocation unit, other resource units can be used as well. For example, a size of m by n rectangle in the time-frequency grid can be used as a resource allocation unit, where m and n are integers greater than or equal to 1. Furthermore, while transmit diversity has been used as an example of a MIMO scheme, other schemes such as beamforming, spatial multiplexing, MU-MIMO can be used instead.

A third set of embodiments disclosed herein deals with a common search space over the E-PDCCH. In an embodiment, a common search space is supported in an E-PDCCH region with cross-interleaving operation. DCIs with the cyclic redundancy check (CRC) scrambled by a system information radio network temporary identifier (SI-RNTI) are transmitted in both the legacy PDCCH and the E-PDCCH. DCIs with the CRC scrambled by a paging or random access channel RNTI (P-/RA-RNTI) are sent over the legacy PDCCH for legacy UEs and over a common search space in the E-PDCCH region for advanced UEs.

For subframes that have a legacy control region, the common search space of the E-PDCCH may start immediately after the legacy control region. The number of OFDM symbols in the legacy control region is indicated by a control channel indicator (CFI) carried by the PCFICH. So the common search space may start from OFDM symbol # k, where k=CFI for a system bandwidth greater than 10 PRBs and k=CFI+1 for other system bandwidths (assuming the OFDM symbol index in a subframe starts at 0). Alternatively, the common search space may always start at a preconfigured OFDM symbol, such as OFDM symbol #3 (assuming the OFDM symbol index in a subframe starts at 0).

Figure 17:
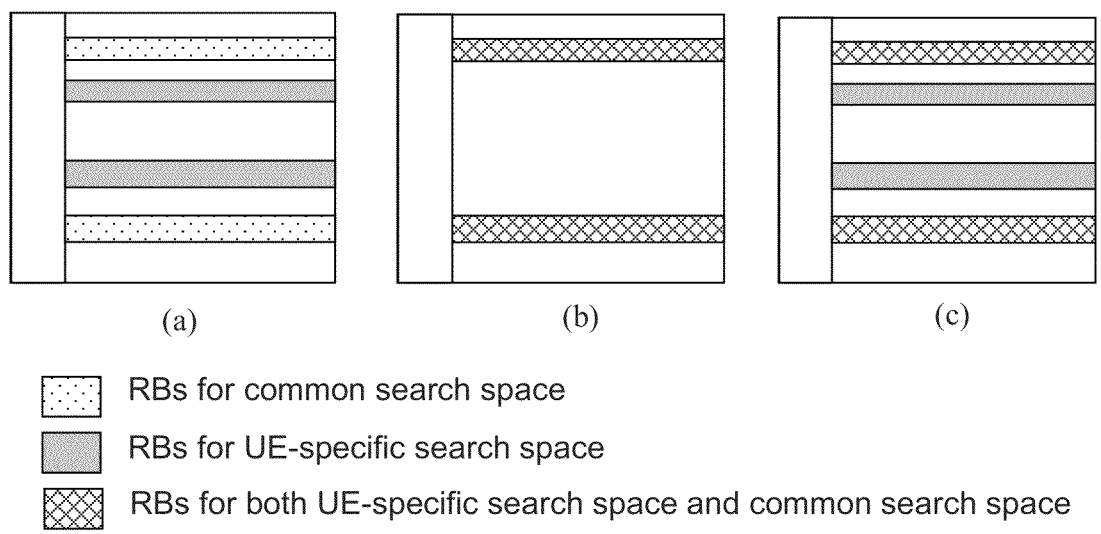
FIG. 17 is a diagram of possible options for common and UE-specific search space resource allocation, according to an embodiment of the disclosure.

Both a common search space and a UE-specific search space may need to be defined over the E-PDCCH. There are at least three options in defining the resources for the common search space vs the UE-specific search space, as illustrated in FIG. 17.

In the first option, as shown in FIG. 17a, the resources for the common search space in the E-PDCCH may not overlap with the resources for the UE-specific search space. In other words, separate resources (e.g., PRBs) may be allocated for the common and UE-specific search spaces. In this case, two E-PDCCH regions are defined and a UE searches each region for common and UE-specific DCIs. A benefit of this option is that UE-specific DCI detection could be simpler, since only one E-PDCCH region may need to be monitored for that purpose. A drawback is that if the resource allocation for the common search space is predefined or semi-statically allocated, some of the resources may be wasted if there is no common DCI to send.

In the second option, as shown in FIG. 17b, the resources for the common search space in the E-PDCCH may overlap with the resources for the UE-specific search space. That is, a single E-PDCCH region may be defined for both search space types. In this case, better resource utilization may be achieved for the common search space. However, if DCIs are cross-interleaved and the PRBs are predefined or semi-statically signaled, overhead could increase if few DCIs need to be sent.

In the third option, as shown in FIG. 17c, two E-PDCCH regions may be present in a subframe. One E-PDCCH region may be for a localized transmission that is exclusively for the UE-specific search space. Another E-PDCCH region may be a distributed region shared by both the common search space and the UE-specific search space. A UE may be configured to search in both the regions for UE-specific DCIs and common DCIs. In this case, better resource utilization may be expected compared with the first and second options, even with semi-static resource allocation for the common search space, but possibly at the cost of increased UE implementation complexity.

In all three options, the resource for the common search space in the E-PDCCH region is predefined and known. In the case of the first option, there are two E-PDCCH regions in a subframe, one with distributed transmission where DCIs may be cross-interleaved and the other with localized transmission where DCIs are not cross-interleaved. The distributed transmission region may be exclusively for the common search space, where multiple DCIs may be cross-interleaved. The PRBs for the distributed transmission region may be either predefined or signaled through the E-PCFICH. The UE-specific search space may be exclusively in the localized transmission region. Depending on the multiplexing method for DCI, different DCIs in the UE-specific search space may be multiplexed in either the PRB/PRB pair level or the sub-PRB/PRB pair level. In the case of the second option, only one E-PDCCH region with distributed transmission is present in a subframe. The region may be predefined or signaled through the E-PCFICH. All DCIs may be cross-interleaved. In this case, the common search space may occupy a known subset of the total resources, and the resources for the common search space may also be overlapped with the UE-specific search space. In the case of the third option, the distributed region may also be shared by the common search space and the UE-specific search space. The resource for the common search space may be predefined.

Figure 18:
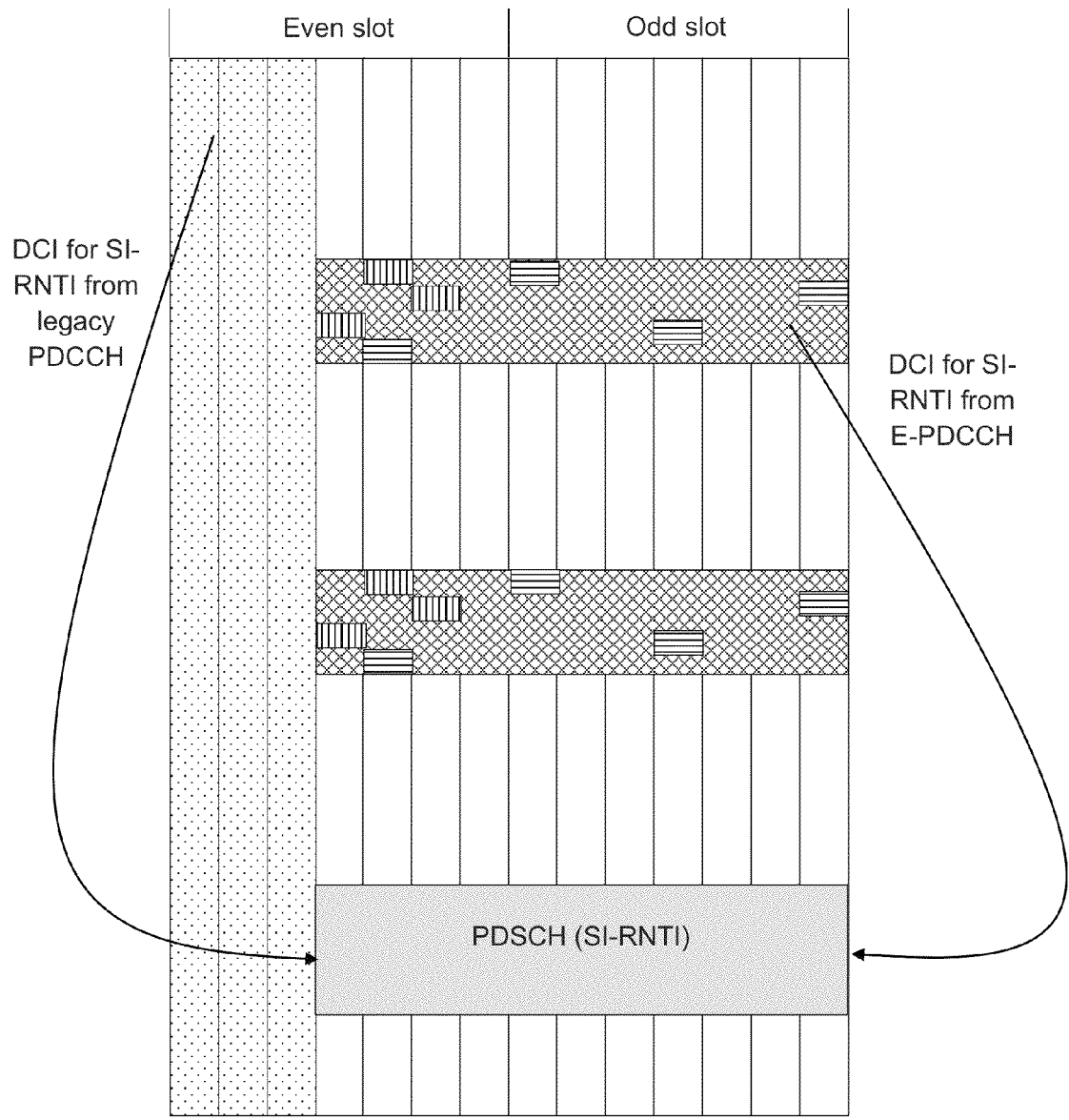
FIG. 18 is a diagram of a pointer to a PDSCH of an SI-RNTI, according to an embodiment of the disclosure.

If both the legacy PDCCH region and the E-PDCCH common search space are present, there could be confusion about where the UEs should search for the common information whose CRC is scrambled by a SI-RNTI, P-RNTI, or RA-RNTI. Since an SI-RNTI is common between legacy UEs and advanced UEs, the common information may need to be transmitted over the legacy PDCCH region. This information may be repeated in the E-PDCCH common search space if an advanced UE (e.g., MTC) cannot or will not detect the legacy PDCCH region. Only one PDSCH carrying a given system information payload is transmitted in a subframe (i.e., not repeated). Only the pointer to the PDSCH is repeated. This is shown in FIG. 18.

For a P-RNTI or an RA-RNTI, considering that there may be a substantially larger number of UEs that need to be signaled (e.g., MTC), the paging and random access-related messages may be divided into at least three scenarios. In a first scenario, some UEs may be defined to receive the common information in the legacy PDCCH region only. This set of UEs may include all legacy UEs (Rel-10 or earlier). In a second scenario, some UEs may be defined to receive the common information in the E-PDCCH common search space only. This set of UEs may include all MTC types of UEs. For MTC, the differentiation may be performed in a relatively straightforward manner by the scheduler. In a third scenario, some UEs may be configured to receive the common information in either the common search space in the legacy PDCCH or the common search space in the E-PDCCH. For example, if the common search space in the E-PDCCH is not configured, the UE may search the common search space in the legacy PDCCH region. Otherwise, the UE may search the common search space in the E-PDCCH region. Such UEs may include UEs in Rel-11 and beyond.

It may be noted that no UE is required to monitor both the common search space in the legacy PDCCH region and the common search space in the E-PDCCH region in a given subframe. Therefore, the number of blind decodings that a specific UE is expected to perform for decoding such a PDCCH may not increase.

A UE capable of detecting DCIs in a common search space in both the legacy PDCCH and the E-PDCCH may need to understand whether or not to search a common search space in an E-PDCCH region. In one embodiment, a common search space is always present within the E-PDCCH region, so no signaling is required to indicate the need to detect the common search space over the E-PDCCH. This may be unavoidable if the network needs to serve MTC UEs that may not have access to the entire legacy control region. For other UEs and with the legacy PDCCH, detecting or not detecting the common search space in the E-PDCCH may be configured by RRC signaling. That is, a UE may be RRC signaled through the legacy PDCCH about whether to perform a search in a common search space in the E-PDCCH region.

With DCIs carried over a common search space, a UE may obtain all the system information in the downlink and, after successful access, may be informed about the UE-specific E-PDCCH configuration through RRC signaling. Before being informed about the UE-specific E-PDCCH configuration, a UE may have to depend on the legacy PDCCH for receiving all downlink and uplink grants.

For a UE that is not capable of detecting DCIs in the legacy PDCCH region, both common and UE-specific search spaces may need to be present in a subframe. PRBs or PRB pairs for the common search space may be either dynamically indicated through the E-PCFICH or predefined. The resources for the common search space within the PRBs/PRB pairs may be predefined. PRBs/PRB pairs for a UE-specific search space may be the same as the PRBs/PRB pairs for the common search space or may be different. When different PRBs/PRB pairs are used, the PRBs/PRB pairs may need to be predefined.

Single antenna transmission or transmit diversity may be configured for a common search space. The antenna number for a common search space transmission may be derived from broadcast information such as the PBCH or may be RRC configured if the antenna number is different from that used for the legacy PDCCH. Therefore, no explicit signaling may be needed to inform the UE which transmission mode is used for a common search in the E-PDCCH. Alternatively, the common search space could be transmitted over a number of distributed resources, e.g., one, two or four PRBs, across the frequency. In addition to distributed resource allocation for the common search space, either a transmit diversity scheme or random beamforming may be applied in the common search space transmission to further exploit diversity gain.

In general, this set of embodiments provides for transmitting a downlink control channel by frequency-division multiplexing with downlink data channels. A time-frequency resource that can be occupied by the downlink control channel is known to a plurality of UEs and varies from a first time interval to a second time interval. The downlink control channel may carry information associated with the SI-RNTI, the P-RNTI, the RA-RNTI, or the C-RNTI.

More specifically, in an embodiment, a common search space may be defined and configured in the E-PDCCH. The common search space in the E-PDCCH may or may not overlap with the UE-specific search space. The common search space may overlap with the distributed UE-specific search space. The common search space may be used to carry system messages and UE-specific messages. A UE may be configured to monitor one common search space in either the legacy PDCCH or the E-PDCCH. The common search space may be present in all E-PDCCHs or the common search space may be configured by higher-layer signaling such as RRC signaling. The common search space may be transmitted over a number of distributed resources. A transmit diversity scheme may be used, with the antenna number being derived either from the PBCH or from RRC signaling.

A fourth set of embodiments disclosed herein deals with coordination of E-PDCCH allocation with fixed signals, such as the primary synchronization signal (PSS), secondary synchronization signal (SSS), and PBCH. In an embodiment, frequency division multiplexing between a cross-interleaving E-PDCCH region and the fixed signals in a subframe (e.g., PSS/SSS/PBCH) is provided so that these predefined signals and channels can coexist without any overlap.

Figure 19:
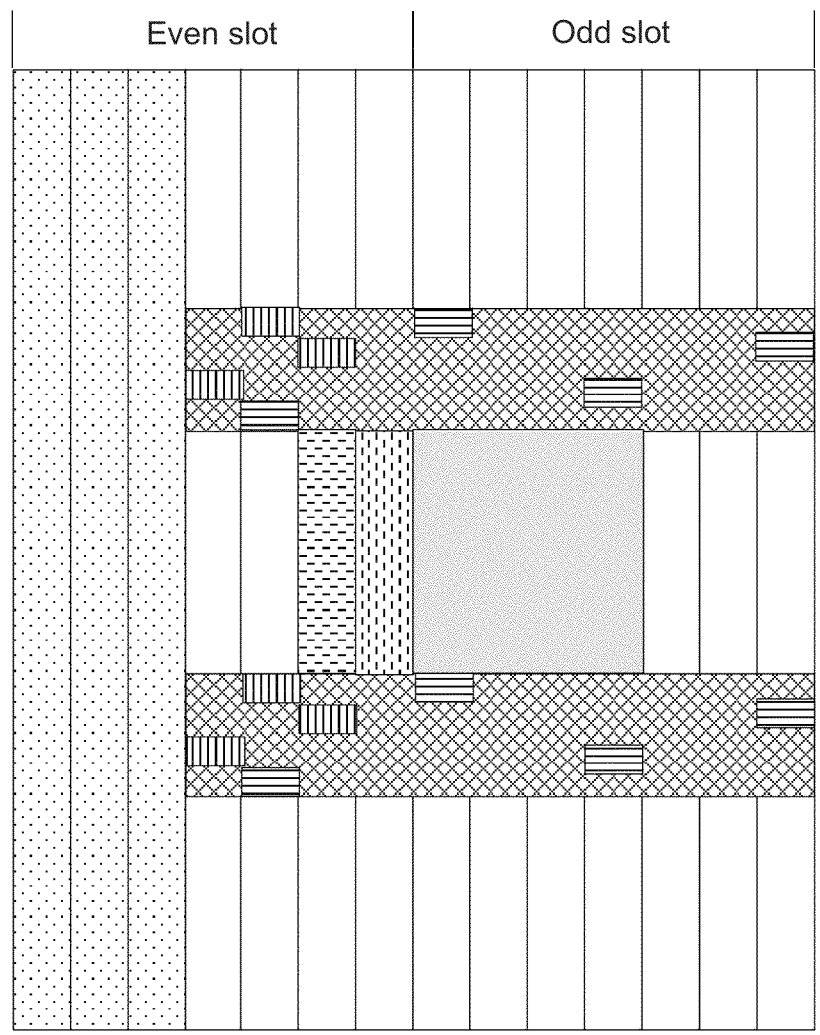
FIG. 19 is a diagram of a cross-interleaving E-PDCCH region relative to PSS/SSS/PBCH, according to an embodiment of the disclosure.

If present, the cross-interleaving E-PDCCH search region may need to coexist with the PSS/SSS/PBCH in a same subframe. In an embodiment, for a bandwidth greater than 1.4 MHz, PRBs for a common search space are allocated immediately above and immediately below the PSS/SSS/PBCH, as shown in FIG. 19. Broadly speaking, the PRBs for the cross-interleaving E-PDCCH region may be any PRBs that do not contain existing signals and channels such as PSS/SSS or PBCH.

In general, this set of embodiments provides for transmitting a common signal over a set of predefined frequency resources and transmitting a shared downlink control channel over a second set of frequency resources. The second set of frequency resources may be non-overlapping with the predefined frequency resources when the shared downlink control channel is transmitted simultaneously with the common signal. The common signal may be a synchronization signal or a physical broadcast channel. The shared downlink control channel may be an E-PCFICH, an E-PHICH, or an E-PDCCH.

A fifth set of embodiments disclosed herein deals with coordination in E-PDCCH allocation between neighbor cells or transmission points. Inter-cell interference coordination (ICIC) may be a motivator in defining the enhanced downlink control channels. In an embodiment, different cells allocate the E-PCFICH and the E-PHICH in non-overlapping resource blocks as much as possible to achieve interference avoidance and/or interference randomization. Additionally or alternatively, different cells map the E-PCFICH and the E-PHICH to non-overlapping resource elements as much as possible to achieve interference avoidance and/or interference randomization. The resources allocated to the E-PCFICH, the E-PHICH, and the cross-interleaving E-PDCCH region may be communicated to neighbor cells for interference avoidance purposes.

One advantage of the E-PDCCH over the legacy PDCCH is the possibility for better coordination of interference between adjacent cells. To optimize performance, it may be desirable to avoid allocating the same PRBs to the cross-interleaving E-PDCCH of adjacent cells.

Figure 20:
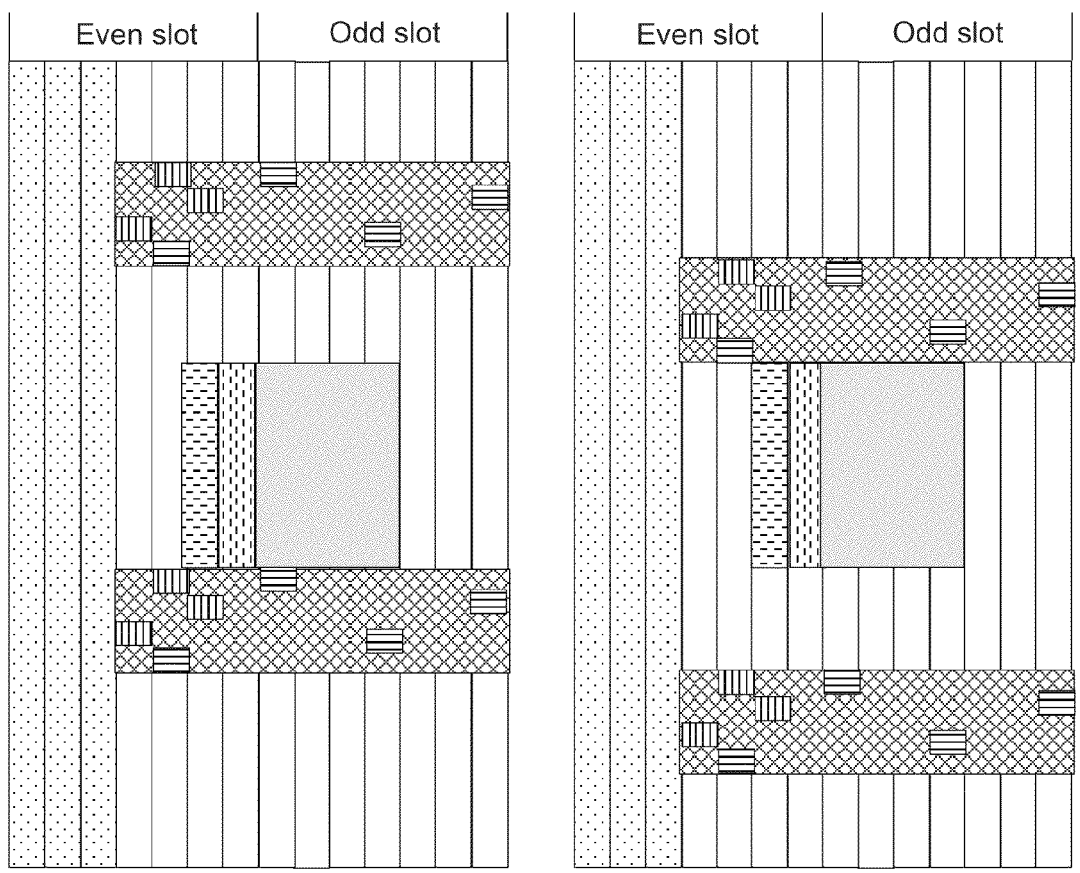
FIG. 20 is a diagram of ICIC of an E-PDCCH common search space between two neighbor cells, according to an embodiment of the disclosure.

In an embodiment, three sets of non-overlapping resources are defined, each corresponding to the cell ID carried by the primary synchronization signal of the cell. This is illustrated with an example in FIG. 20. In practical deployments, it may not be possible to always achieve interference avoidance or to achieve interference avoidance with a simple algorithm. In an embodiment, interference randomization is used in conjunction with interference avoidance. For example, the cross-interleaving region may be a pseudo-random function of the physical cell ID and the subframe index. Even if two neighbor cells happen to overlap in one subframe, they are unlikely to overlap in the next subframe.

Alternatively, if the overlapping E-PDCCH resources are allocated among neighbor cells or TPs, the resource units may be shifted based on the cell ID (or TP ID or CSI-RS resource associated with the TP). Such a shift may protect the E-PCFICH and, more importantly, the E-PHICH, and may avoid the collision of such channels from neighbor cells or TPs. For example, indices of the REGs that the E-PCFICH and the E-PHICH occupy may be generated with a function of cell ID. Alternatively, the resources allocated to the E-PCFICH, the E-PHICH, and the cross-interleaving E-PDCCH region may be communicated to neighbor cells via the X2 interface for interference coordination purposes.

In general, this set of embodiments provides for transmitting a first shared downlink control channel from a first time-frequency resource by a first transmission point and transmitting a second shared downlink control channel from a second time-frequency resource by a second transmission point. The first shared downlink control channel and the second downlink control channel may carry the same downlink control information. Non-overlapping of the first time-frequency resource with the second time-frequency resource may be achieved by coordinating the transmissions of the first and the second transmission points. The same downlink control information may be a HARQ-ACK response or configuration information of another downlink control channel. The coordinating may be performed by a base station or other access node that is connected to both the first transmission point and the second transmission point. The coordinating may be performed by exchanging information between the first transmission point and the second transmission point.

More specifically, in an embodiment, resources for the E-PDDCH, E-PCFICH and E-PHICH from different cells may be shifted based on the cell ID or other TP-related parameters (e.g., TP ID) to avoid collisions and mitigate interference.

A sixth set of embodiments disclosed herein deals with PUCCH resource mapping. In LTE Rel-8, the resource used to transmit a HARQ ACK/NACK over the PUCCH is linked to the index of the first CCE of the corresponding PDCCH carrying the downlink grant. If the E-PDCCH is introduced, this implicit relationship may need to be re-evaluated.

In an embodiment, implicit indication of PUCCH resources via E-PDCCH resources is provided. The index of the first resource unit of the E-PDCCH may be used to indicate the PUCCH resource. If multiple E-PDCCH regions are configured, the index of the starting resource unit of each region may be signaled to a UE to ensure that the UE can generate a distinct PUCCH resource for each corresponding E-PDCCH.

Two types of E-PDCCH transmission may be supported. One is localized transmission, where the E-PDCCH for a UE occupies contiguous resources within an E-PDCCH region. The other is distributed transmission, where an E-PDCCH occupies non-contiguous resources and E-PDCCHs for multiple UEs are multiplexed and transmitted from the same set of PRBs or PRB pairs. In the latter case, if the CCE structure as defined in Rel-8 is re-used, the mapping between the CCE index and the PUCCH resource could be reused. In localized transmission, as the CCE structure may not be the same as in Rel-8, the implicit mapping relation between the CCE index and the PUCCH resource may need to be redefined.

Figure 21:
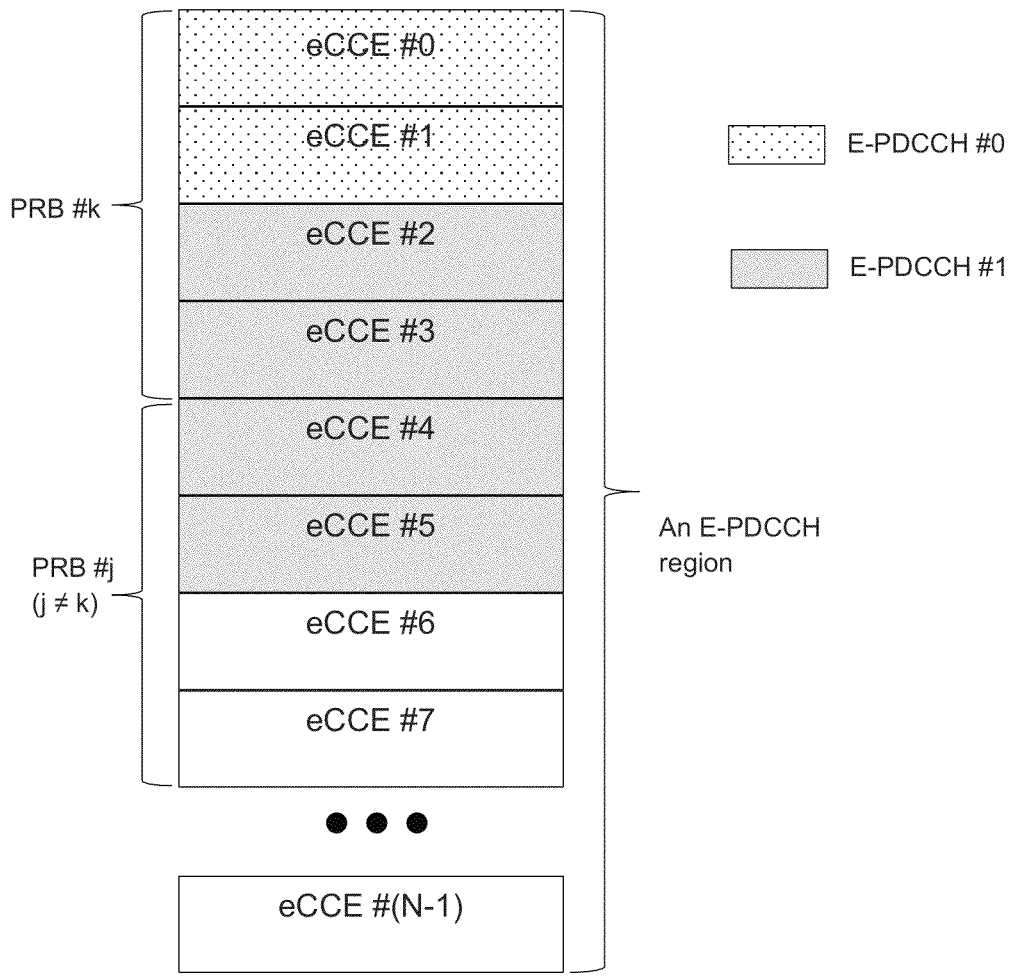
FIG. 21 is a diagram of an eCCE index for a localized E-PDCCH transmission, according to an embodiment of the disclosure.

In localized E-PDCCH transmission, a new resource unit may be used, which consists of a subset of the resource elements in a PRB pair. Such a unit can be referred to as an eCCE (enhanced CCE). If multiple E-PDCCHs are transmitted using localized transmission, as shown in FIG. 21, their eCCEs may be arranged in a queue and assigned with indices in ascending order. In this case, the UE may still use the first eCCE index of an E-PDCCH to generate a resource for its corresponding PUCCH transmission.

Figure 22:
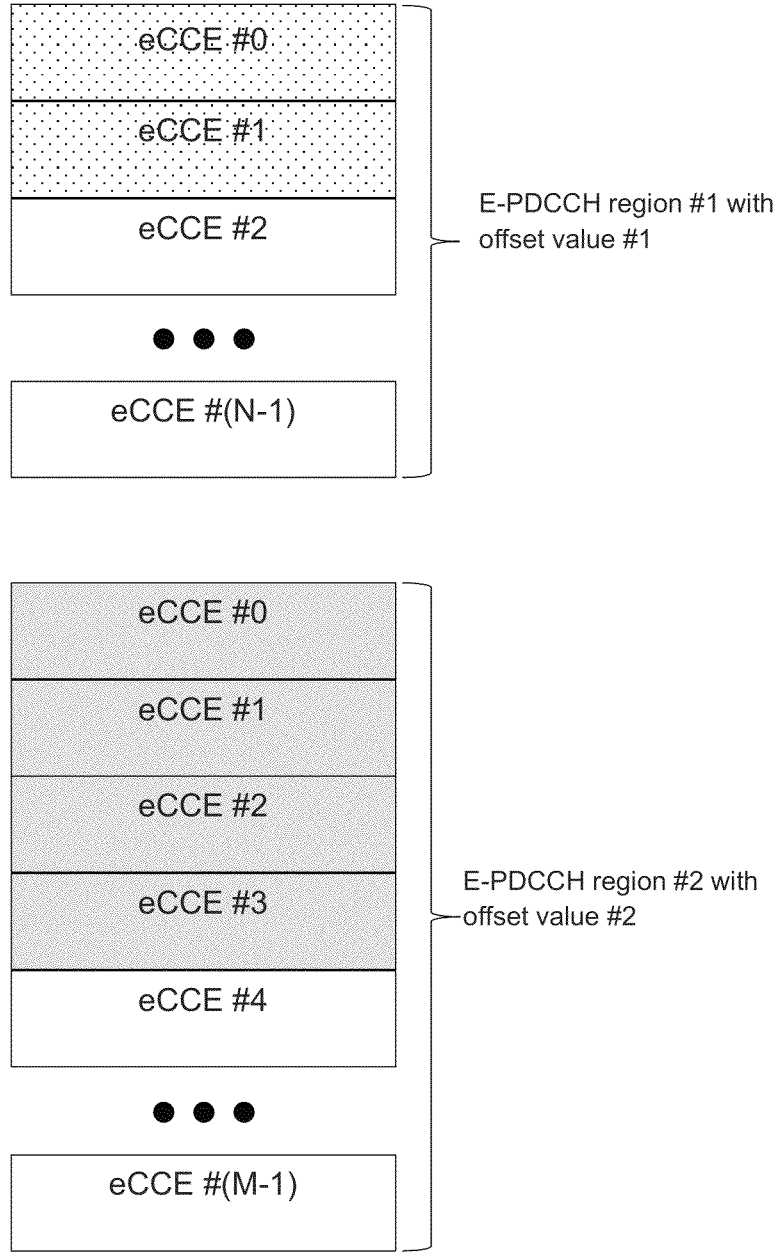
FIG. 22 is a diagram of a starting index of an eCCE in each E-PDCCH region, according to an embodiment of the disclosure.

For the case where there are multiple E-PDCCH regions configured, an offset for a region may be signaled to a UE, which may be configured to search this region for its E-PDCCH. This is illustrated in FIG. 22. The UE may use the sum of the offset and the index of the first eCCE of an E-PDCCH to derive the corresponding PUCCH resource index. Alternatively, the UE may use the sum of the offset and the index of the last eCCE of an E-PDCCH to derive the corresponding PUCCH resource index. The offset of each E-PDCCH region may be selected such that all the corresponding PUCCH resource indices for the region are not overlapped with the PUCCH resource indices for other E-PDCCH regions and the legacy PDCCH region. The offsets may be sent semi-statically to the UE using higher layer signaling as part of the UE E-PDCCH configuration.

In general, the PUCCH resource for transmitting ACK/NACK signals may be implicitly linked to an eCCE index of the corresponding E-PDCCH.

The embodiments disclosed herein provide a detailed design of the E-PCFICH, the E-PHICH, and the common search space of the E-PDCCH. Signaling procedures for the enhanced control channels are described, as is resource allocation within a subframe, taking into consideration the DMRS distribution. Inter-cell interference management of the common control channels is also taken into account. PUCCH resource mapping procedures for the E-PDCCH are provided and embodiments are disclosed that allow PUCCH resource generation in an implicit way.

Figure 23:
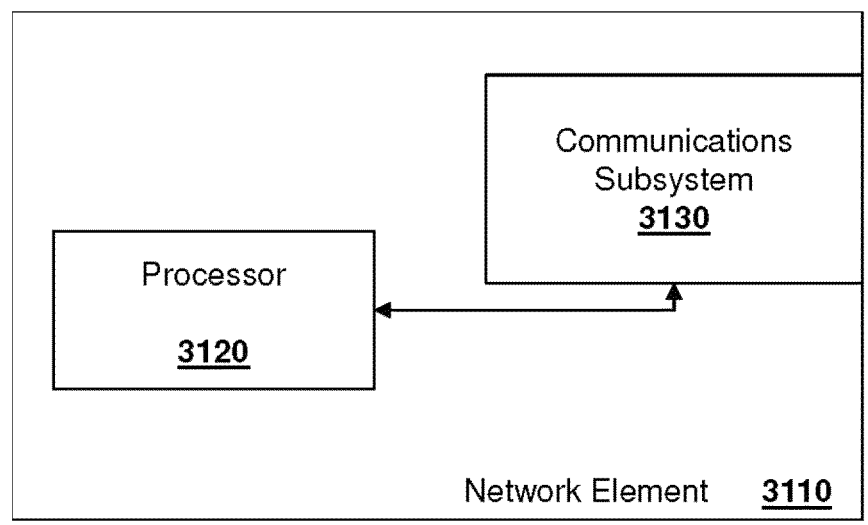
FIG. 23 is a simplified block diagram of an exemplary network element according to one embodiment.

The above may be implemented by a network element. A simplified network element is shown with regard to FIG. 23. In FIG. 23, network element 3110 includes a processor 3120 and a communications subsystem 3130, where the processor 3120 and communications subsystem 3130 cooperate to perform the methods described above.

Figure 24:
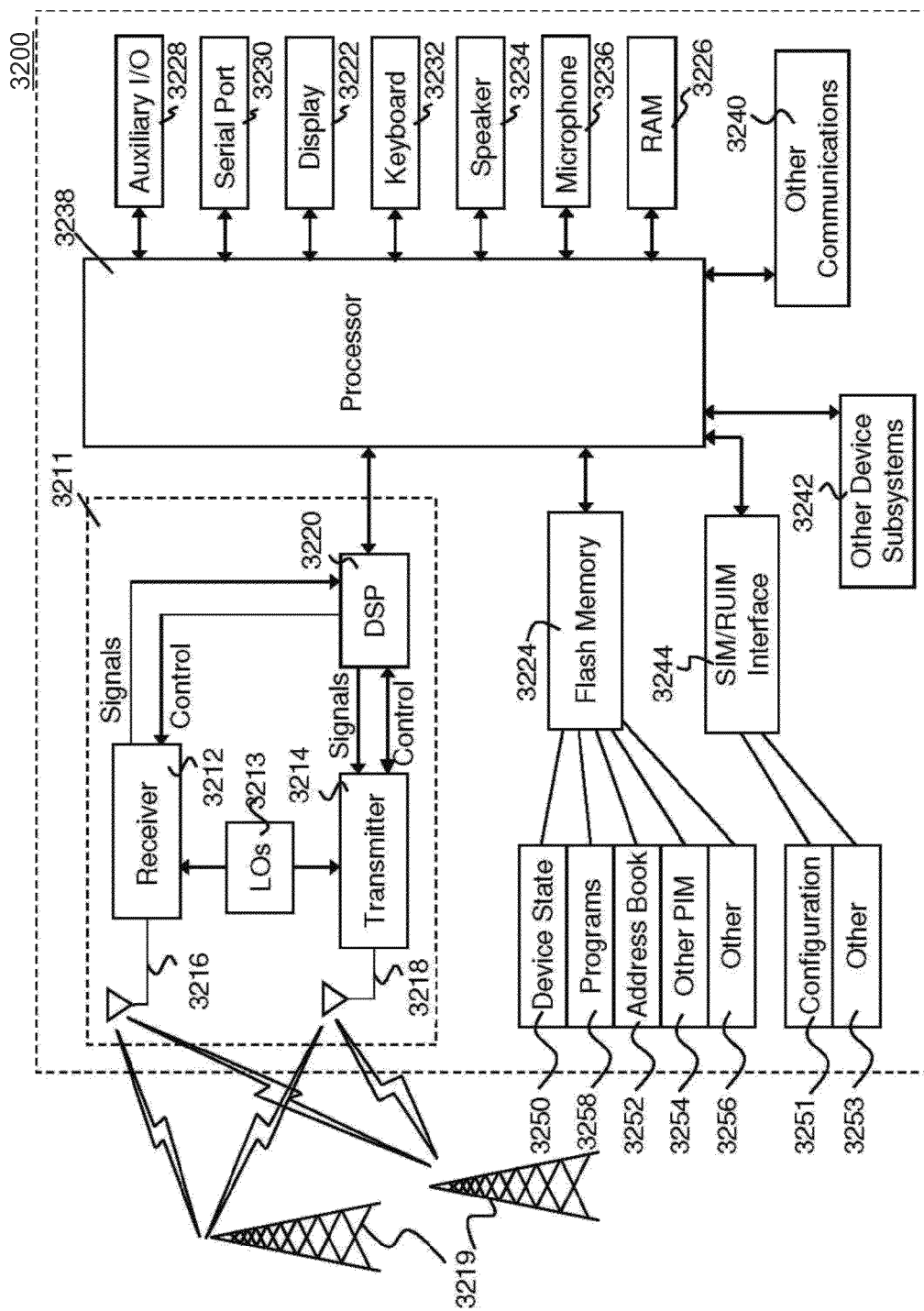
FIG. 24 is a block diagram with an example user equipment capable of being used with the systems and methods in the embodiments described herein.

Further, the above may be implemented by a UE. An example of a UE is described below with regard to FIG. 24. UE 3200 may comprise a two-way wireless communication device having voice and data communication capabilities. In some embodiments, voice communication capabilities are optional. The UE 3200 generally has the capability to communicate with other computer systems on the Internet. Depending on the exact functionality provided, the UE 3200 may be referred to as a data messaging device, a two-way pager, a wireless e-mail device, a cellular telephone with data messaging capabilities, a wireless Internet appliance, a wireless device, a smart phone, a mobile device, or a data communication device, as examples.

Where the UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. The particular design of the communication subsystem 3211 may be dependent upon the communication network in which the UE 3200 is intended to operate.

Network access requirements may also vary depending upon the type of network 3219. In some networks, network access is associated with a subscriber or user of the UE 3200. The UE 3200 may require a removable user identity module (RUIM) or a subscriber identity module (SIM) card in order to operate on a network. The SIM/RUIM interface 3244 is typically similar to a card slot into which a SIM/RUIM card may be inserted. The SIM/RUIM card may have memory and may hold many key configurations 3251 and other information 3253, such as identification and subscriber-related information.

When required network registration or activation procedures have been completed, the UE 3200 may send and receive communication signals over the network 3219. As illustrated, the network 3219 may consist of multiple base stations communicating with the UE 3200.

Signals received by antenna 3216 through communication network 3219 are input to receiver 3212, which may perform such common receiver functions as signal amplification, frequency down conversion, filtering, channel selection, and the like. Analog to digital (A/D) conversion of a received signal allows more complex communication functions, such as demodulation and decoding to be performed in the DSP 3220. In a similar manner, signals to be transmitted are processed, including modulation and encoding for example, by DSP 3220 and are input to transmitter 3214 for digital to analog (D/A) conversion, frequency up conversion, filtering, amplification, and transmission over the communication network 3219 via antenna 3218. DSP 3220 not only processes communication signals but also provides for receiver and transmitter control. For example, the gains applied to communication signals in receiver 3212 and transmitter 3214 may be adaptively controlled through automatic gain control algorithms implemented in DSP 3220.

The UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem, and any other device subsystems generally designated as 3242. Serial port 3230 may include a USB port or other port currently known or developed in the future.

Some of the illustrated subsystems perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions, such as a calculator or task list.

Operating system software used by the processor 3238 may be stored in a persistent store such as flash memory 3224, which may instead be a read-only memory (ROM) or similar storage element (not shown). The operating system, specific device applications, or parts thereof, may be temporarily loaded into a volatile memory such as RAM 3226. Received communication signals may also be stored in RAM 3226.

As shown, flash memory 3224 may be segregated into different areas for both computer programs 3258 and program data storage 3250, 3252, 3254 and 3256. These different storage types indicate that each program may allocate a portion of flash memory 3224 for their own data storage requirements. Processor 3238, in addition to its operating system functions, may enable execution of software applications on the UE 3200. A predetermined set of applications that control basic operations, including at least data and voice communication applications for example, may typically be installed on the UE 3200 during manufacturing. Other applications may be installed subsequently or dynamically.

Applications and software may be stored on any computer-readable storage medium. The computer-readable storage medium may be tangible or in a transitory/non-transitory medium such as optical (e.g., CD, DVD, etc.), magnetic (e.g., tape), or other memory currently known or developed in the future.

One software application may be a personal information manager (PIM) application having the ability to organize and manage data items relating to the user of the UE 3200 such as, but not limited to, e-mail, calendar events, voice mails, appointments, and task items. One or more memory stores may be available on the UE 3200 to facilitate storage of PIM data items. Such a PIM application may have the ability to send and receive data items via the wireless network 3219. Further applications may also be loaded onto the UE 3200 through the network 3219, an auxiliary I/O subsystem 3228, serial port 3230, short-range communications subsystem 3240, or any other suitable subsystem 3242, and installed by a user in the RAM 3226 or a non-volatile store (not shown) for execution by the processor 3238. Such flexibility in application installation may increase the functionality of the UE 3200 and may provide enhanced on-device functions, communication-related functions, or both. For example, secure communication applications may enable electronic commerce functions and other such financial transactions to be performed using the UE 3200.

In a data communication mode, a received signal such as a text message or web page download may be processed by the communication subsystem 3211 and input to the processor 3238, which may further process the received signal for output to the display 3222, or alternatively to an auxiliary I/O device 3228.

A user of the UE 3200 may also compose data items, such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of the UE 3200 is similar, except that received signals may typically be output to a speaker 3234 and signals for transmission may be generated by a microphone 3236. Alternative voice or audio I/O subsystems, such as a voice message recording subsystem, may also be implemented on the UE 3200. Although voice or audio signal output may be accomplished primarily through the speaker 3234, display 3222 may also be used to provide an indication of the identity of a calling party, the duration of a voice call, or other voice call-related information, for example.

Serial port 3230 may be implemented in a personal digital assistant (PDA)-type device for which synchronization with a user's desktop computer (not shown) may be desirable, but such a port is an optional device component. Such a port 3230 may enable a user to set preferences through an external device or software application and may extend the capabilities of the UE 3200 by providing for information or software downloads to the UE 3200 other than through a wireless communication network. The alternate download path may, for example, be used to load an encryption key onto the UE 3200 through a direct and thus reliable and trusted connection to thereby enable secure device communication. Serial port 3230 may further be used to connect the device to a computer to act as a modem.

Other communications subsystems 3240, such as a short-range communications subsystem, are further optional components which may provide for communication between the UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi, WiMAX, near field communication (NFC), and/or radio frequency identification (RFID). The other communications element 3240 may also be used to communicate with auxiliary devices such as tablet displays, keyboards or projectors.

Figure 25:
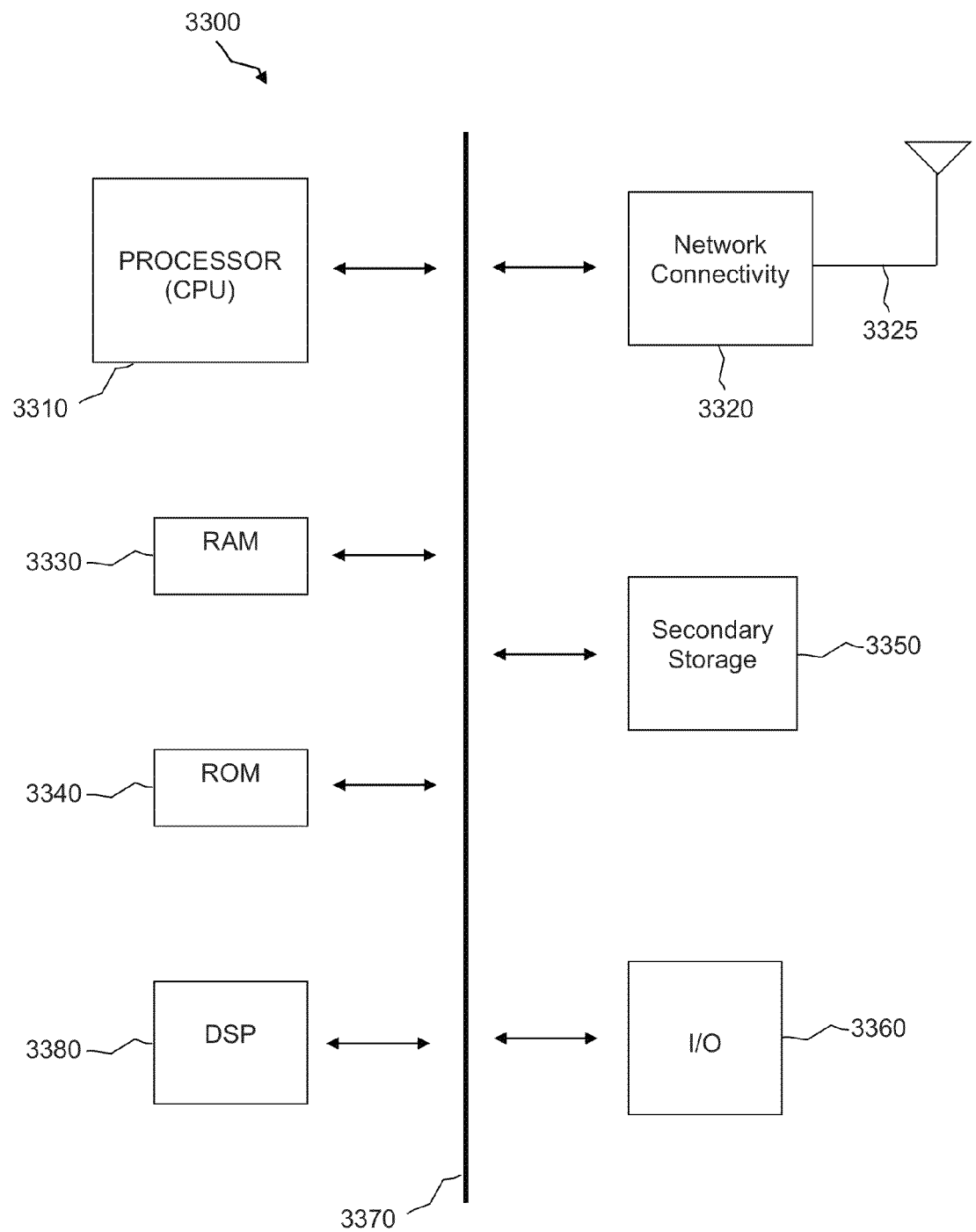
FIG. 25 illustrates a processor and related components suitable for implementing the several embodiments of the present disclosure.

The UE and other components described above might include a processing component that is capable of executing instructions related to the actions described above. FIG. 25 illustrates an example of a system 3300 that includes a processing component 3310 suitable for implementing one or more embodiments disclosed herein. In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

The following are incorporated herein by reference for all purposes: 3GPP TS 36.211, 3GPP TS 36.212, 3GPP TS 36.213, and 3GPP TS 36.331.

In an embodiment, a method for communication in a wireless telecommunication system is provided. The method comprises transmitting, by a network element, a downlink control channel over a set of resource elements, wherein the downlink control channel carries at least one parameter that configures a control channel region, and wherein the control channel region is frequency-division multiplexed with a downlink data channel.

In another embodiment, a network element is provided. The network element comprises a processor configured such that the network element transmits a downlink control channel over a set of resource elements, wherein the downlink control channel carries at least one parameter that configures a control channel region, and wherein the control channel region is frequency-division multiplexed with a downlink data channel.

In another embodiment, a method for communication in a wireless telecommunication system is provided. The method comprises mapping, by a network element, signals of a HARQ-ACK response to a plurality of resource elements, wherein resource blocks containing signals of the HARQ-ACK response are frequency-division multiplexed with resource blocks of a data channel, and wherein a configuration of the plurality of resource elements for the HARQ signals is signaled to UEs before signals of the HARQ-ACK response are transmitted. The method further comprises transmitting the signals of the HARQ-ACK response.

In another embodiment, a network element is provided. The network element comprises a processor configured such that the network element maps signals of a HARQ-ACK response to a plurality of resource elements, wherein resource blocks containing signals of the HARQ-ACK response are frequency-division multiplexed with resource blocks of a data channel, and wherein a configuration of the plurality of resource elements for the HARQ signals is signaled to UEs before signals of the HARQ-ACK response are transmitted. The processor is further configured such that the network element transmits the signals of the HARQ-ACK response.

In another embodiment, a method for communication in a wireless telecommunication system is provided. The method comprises designating, by a network element, a first set of time-frequency resources for transmitting a first set of downlink control channels for a plurality of UEs, wherein the first set of time-frequency resources is known to the plurality of UEs, and wherein the first set of time-frequency resources varies from a first time interval to a second time interval. The method further comprises mapping, by the network element, a first downlink control channel to the first set of time-frequency resources. The method further comprises transmitting, by the network element, the first downlink control channel together with a downlink data channel in a frequency-division multiplexing manner.

In another embodiment, a network element is provided. The network element comprises a processor configured such that the network element designates a first set of time-frequency resources for transmitting a first set of downlink control channels for a plurality of UEs, wherein the first set of time-frequency resources is known to the plurality of UEs, and wherein the first set of time-frequency resources varies from a first time interval to a second time interval. The processor is further configured such that the network element maps a first downlink control channel to the first set of time-frequency resources. The processor is further configured such that the network element transmits the first downlink control channel together with a downlink data channel in a frequency-division multiplexing manner.

In another embodiment, a method for communication in a wireless telecommunication system is provided. The method comprises mapping, by a first network element, a common signal to a first set of time-frequency resources in a subframe, wherein the first set of time-frequency resources is predefined. The method further comprises mapping, by the first network element, an enhanced downlink control channel to a second set of time-frequency resources in the subframe, wherein the first set of time-frequency resources and the second set of time-frequency resources do not overlap. The method further comprises transmitting, by the first network element, the common signal and the enhanced downlink control channel in the same subframe.

In another embodiment, a network element is provided. The network element comprises a processor configured such that the network element maps a common signal to a first set of time-frequency resources in a subframe, wherein the first set of time-frequency resources is predefined. The processor is further configured such that the network element maps an enhanced downlink control channel to a second set of time-frequency resources in the subframe, wherein the first set of time-frequency resources and the second set of time-frequency resources do not overlap. The processor is further configured such that the network element transmits the common signal and the enhanced downlink control channel in the same subframe.

In another embodiment, a method for communication in a wireless telecommunication system is provided. The method comprises mapping, by a network element, an E-PDCCH that carries downlink scheduling information to a UE to indicate a downlink data transmission over a PDSCH to the UE, into a plurality of eCCEs, wherein an eCCE consists of a number of predefined REs in an RB pair. The method further comprises linking, by the network element, a resource index of a PUCCH to an index of one of the plurality of eCCEs, wherein the PUCCH is provided for transmitting, by the UE, back to the network element, an ACK or a NACK about a decoding status of the PDSCH.

In another embodiment, a network element is provided. The network element comprises a processor configured such that the network element maps an E-PDCCH that carries downlink scheduling information to a UE to indicate a downlink data transmission over a PDSCH to the UE, into a plurality of eCCEs, wherein an eCCE consists of a number of predefined REs in an RB pair. The processor is further configured such that the network element links a resource index of a PUCCH to an index of one of the plurality of eCCEs, wherein the PUCCH is provided for transmitting, by the UE, back to the network element, an ACK or a NACK about a decoding status of the PDSCH.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for communication in a wireless telecommunication system, the method comprising:

designating, by a network element, a first set of time-frequency resources for transmitting a first set of downlink control channels for a plurality of user equipment (UEs), wherein the first set of time-frequency resources is known to the plurality of UEs, and wherein the first set of time-frequency resources varies from a first time interval to a second time interval, wherein the first set of time-frequency resources comprise at least one of consecutive or distributed resources designated for an enhanced physical downlink control channel (E-PDCCH);

mapping, by the network element, a first region of the E-PDCCH to the first set of time-frequency resources; and transmitting, by the network element, the E-PDCCH in a subframe comprising a physical downlink control channel (PDCCH) and a physical downlink shared channel (PDSCH), wherein the E-PDCCH is transmitted simultaneously with the PDSCH in a frequency-division multiplexing manner such that the E-PDCCH occupies different resource blocks (RBs) than the PDSCH,
wherein resource allocation configuration of the first set of time-frequency resources is dynamically signaled through an enhanced physical control format indicator channel (E-PCFICH) that is transmitted earlier in time than the E-PDCCH.

2. The method of claim 1, wherein the first set of downlink control channels carry downlink control information (DCI) common to a plurality of UEs.

3. The method of claim 2, wherein a DCI in the first region of the E-PDCCH carries information associated with a system information radio network temporary identifier (SI-RNTI).

4. The method of claim 3, wherein the DCI in the first region of the E-PDCCH carries the same scheduling information that is carried on a legacy control region in the PDCCH of the same subframe for a plurality of UEs, wherein the DCI is transmitted with its cyclic redundancy check (CRC) bits scrambled by the system information radio network temporary identifier (SI-RNTI).

5. The method of claim 2, wherein a DCI in the first region of the E-PDCCH carries information associated with a paging radio network temporary identifier (P-RNTI).

6. The method of claim 1, wherein the first region of the E-PDCCH carries information specific to a single UE.

7. The method of claim 6, wherein the first region of the E-PDCCH includes downlink control information (DCI) associated with a cell radio network temporary identifier (C-RNTI).

8. The method of claim 1, further comprising:
mapping a second region of the E-PDCCH to the first set of time-frequency resources, wherein DCIs within the first and the second regions are cross-interleaved and distributed over the first set of time-frequency resources, the first and second regions defining a common search space and a UE-specific search space,
wherein the E-PDCCH occupies a pair of non-adjacent RBs spanning two slots of the subframe, each RB in the pair allocating resource elements (REs) shared by the common search space and the UE-specific search space.

9. The method of claim 1, further comprising:
designating a second set of time-frequency resources for at least a second region of the E-PDCCH, wherein the second region is a localized transmission region that is exclusively for a UE-specific search space, and wherein the first region of the E-PDCCH is a distributed region in which consecutive available time-frequency resources are allocated for the UE-specific search space and a common search space in the E-PDCCH.

10. The method of claim 9, wherein separate RBs are allocated to the first and the second sets of time-frequency resources such that resource elements (REs) in the first region of the E-PDCCH do not overlap with REs in the second region of the E-PDCCH.

11. A network element comprising:
a processor configured such that the network element:
designates a first set of time-frequency resources for transmitting a first set of downlink control channels for a plurality of user equipment (UEs), wherein the first set of time-frequency resources is known to the plurality of UEs, and wherein the first set of time-frequency resources varies from a first time interval to a second time interval;
maps a first region of an enhanced physical downlink control channel (E-PDCCH) to the first set of time-frequency resources; and
transmits the E-PDCCH in a subframe comprising a physical downlink control channel (PDCCH) and a physical downlink shared channel (PDSCH), wherein the E-PDCCH is transmitted simultaneously with the PDSCH in a frequency-division multiplexing manner such that the E-PDCCH occupies different resource blocks (RBs) than the PDSCH,
wherein the first set of time-frequency resources comprise at least one of consecutive or distributed resources designated for the E-PDCCH,
wherein resource allocation configuration of the first set of time-frequency resources is dynamically signaled through an enhanced physical control format indicator channel (E-PCFICH) that is transmitted earlier in time than the E-PDCCH.

12. The network element of claim 11, wherein the first set of time-frequency resources occupies a first pair of RBs and a second set of time-frequency resources occupies a second pair of RBs, each RB in the first and second pairs comprising a known subset of the total resources used to transmit the E-PDCCH in the subframe, and wherein the first pair of RBs comprise resource elements (REs) allocated only for a common search space in the E-PDCCH and the second pair of RBs comprise REs allocated only for a UE-specific search space in the E-PDCCH.

13. The network element of claim 11, wherein the first set of time-frequency resources is allocated to a distributed region in the E-PDCCH which is used to transmit downlink control information (DCI) common to at least one UE.

14. The network element of claim 11, wherein the network element informs the UEs to detect a common search space in the first region of the E-PDCCH.

15. The network element of claim 11, wherein the first set of time-frequency resources define a common search space that is present in every subframe in which an enhanced physical downlink control channel (E-PDCCH) is present.

16. A method for communication in a wireless telecommunication system, the method comprising:
mapping, by a network element, an enhanced physical downlink control channel (E-PDCCH) that carries downlink scheduling information to a user equipment (UE) to indicate a downlink data transmission over a physical downlink shared channel (PDSCH) to the UE, into a plurality of enhanced control channel elements (eCCEs), wherein each eCCE consists of a number of predefined resource elements (REs) in a resource block (RB) pair, wherein the RB pair containing the plurality of eCCEs is signaled to the UE semi-statically using radio resource control (RRC) signaling; and
linking, by the network element, a resource index of a physical uplink control channel (PUCCH) to an index of one of the plurality of eCCEs, wherein the PUCCH is provided for transmitting, by the UE, back to the network element, a positive acknowledgement (ACK) or a negative acknowledgement (NACK) about a decoding status of the PDSCH.

17. The method of claim 16, wherein the eCCEs are a subset of a set of eCCEs which are consecutively indexed and configured for possible E-PDCCH transmission to the UE.

18. The method of claim 17, wherein the eCCEs are arranged in multiple regions of the E-PDCCH, and wherein the E-PDCCH is multiplexed with the PDSCH.

19. The method of claim 17, wherein an offset value is associated with each set of eCCEs.

20. The method of claim 19, wherein the offset values are signaled to the UE semi-statically using higher layer signaling.

21. The method of claim 19, wherein the resource index of the PUCCH is obtained by adding the index of one of the eCCEs to the offset value.

22. A network element comprising:
a processor configured such that the network element maps an enhanced physical downlink control channel (E-PDCCH) that carries downlink scheduling information to a user equipment (UE) to indicate a downlink data transmission over a physical downlink shared channel (PDSCH) to the UE, into a plurality of enhanced control channel elements (eCCEs), wherein each eCCE consists of a number of predefined resource elements (REs) in a resource block (RB) pair, wherein the RB pair containing the plurality of eCCEs is signaled to the UE semi-statically using radio resource control (RRC) signaling; and the processor further configured such that the network element links a resource index of a physical uplink control channel (PUCCH) to an index of one of the plurality of eCCEs, wherein the PUCCH is provided for transmitting, by the UE, back to the network element, a positive acknowledgement (ACK) or a negative acknowledgement (NACK) about a decoding status of the PDSCH.

23. The network element of claim 22, wherein one of the plurality of eCCEs is the eCCE with the smallest index value.

24. The network element of claim 22, wherein one of the plurality of eCCEs is the eCCE with the largest index value.

* * * * *

UNITED STATES PATENT AND TRADEMARK OFFICE
CERTIFICATE OF CORRECTION

PATENT NO. : 9,198,181 B2  
APPLICATION NO. : 13/545548  
DATED : November 24, 2015  
INVENTOR(S) : Yufei Wu Blankenship et al.

Page 1 of 1

It is certified that error appears in the above-identified patent and that said Letters Patent is hereby corrected as shown below:

In the claims  
Claim 8, Column 27, Line 35 replace "DC1s" with --DCIs--

Signed and Sealed this  
Twenty-third Day of February, 2016

Michelle K. Lee  
*Director of the United States Patent and Trademark Office*